(12) United States Patent
Belenky et al.

(10) Patent No.: US 7,990,451 B2
(45) Date of Patent: Aug. 2, 2011

(54) OPTICAL PIXEL AND IMAGE SENSOR

(75) Inventors: Alexander Belenky, Beer-Sheva (IL); Alexander Fish, Hadera (IL); Orly Yadid-Pecht, Haifa (IL)

(73) Assignee: Ben Gurion University of the Negev Research and Development Authority, Beer-Sheva (IL)

( * ) Notice: Subject to any disclaimer, the term of this patent is extended or adjusted under 35 U.S.C. 154(b) by 0 days.

(21) Appl. No.: 12/515,416

(22) PCT Filed: Nov. 19, 2007

(86) PCT No.: PCT/IL2007/001427
§ 371 (c)(1),
(2), (4) Date: Sep. 17, 2009

(87) PCT Pub. No.: WO2008/062404
PCT Pub. Date: May 29, 2008

(65) Prior Publication Data
US 2010/0026838 A1  Feb. 4, 2010

Related U.S. Application Data

(60) Provisional application No. 60/859,956, filed on Nov. 20, 2006.

(51) Int. Cl.
*H04N 3/14* (2006.01)
*H04N 5/335* (2011.01)
*H04N 5/235* (2006.01)
*G03B 7/00* (2006.01)
*H01L 27/00* (2006.01)

(52) U.S. Cl. ........ 348/297; 348/296; 348/302; 348/362; 250/208.1

(58) Field of Classification Search .................. 348/294, 348/296–7, 302, 362; 250/208.1
See application file for complete search history.

(56) References Cited

U.S. PATENT DOCUMENTS

| | | | |
|---|---|---|---|
| 6,529,240 B2 | 3/2003 | Tan et al. |
| 6,667,769 B2 | 12/2003 | Harton et al. |
| 6,831,689 B2 | 12/2004 | Yadid-Pecht |
| 6,963,370 B2 | 11/2005 | DiCarlo et al. |
| 6,977,685 B1 | 12/2005 | Acosta-Serafini et al. |
| 2003/0112351 A1 | 6/2003 | Clark |
| 2007/0091175 A1 | 4/2007 | Iddan et al. |

FOREIGN PATENT DOCUMENTS

| WO | WO 2005/076037 | 8/2005 |
| WO | WO 2008/062404 | 5/2008 |

OTHER PUBLICATIONS

International Preliminary Report on Patentability Dated Jun. 4, 2009 From the International Bureau of WIPO Re.: Application No. PCT/IL2007/001427.
International Search Dated Sep. 18, 2008 From the International Searching Authority Re.: Application No. PCT/IL07/01427.

(Continued)

*Primary Examiner* — Tuan Ho
*Assistant Examiner* — Daniel M Pasiewicz

(57) ABSTRACT

A photosensitive pixel includes a photosensor and an externally loadable flag. The photosensor outputs a signal indicative of an intensity of incident light. The externally loadable flag indicates the pixel reset state, and is preferably stored in an in-pixel memory. Pixel reset logic resets the photosensor in accordance with the reset state and an externally applied reset signal.

27 Claims, 15 Drawing Sheets

OTHER PUBLICATIONS

Written Opinion Dated Sep. 18, 2008 From the International Searching Authority Re.: Application No. PCT/IL07/01427.

Belenky et al. "Global Shutter CMOS Image Sensor With Wide Dynamic Range", 13th IEEE Conference on Electronics, Circuits and Systems, ICECS '06, p. 314-317, Dec. 10-13, 2006.

Yadid-Pecht et al. "In-Pixel Autoexposure CMOS APS", IEEE Journal of Solid-State Circuits, 38(8): 1425-1428, Aug. 2003.

International Search Report and the Written Opinion Dated Jun. 9, 2010 From the International Searching Authority Re. Application No. PCT/IL2010/000054.

Acosta-Serafini et al. "A ⅔" VGA Linear Wide Dynamic Range CMOS Image Sensor Implementing a Predictive Multiple Sampling Algorithm With Overlapping Integration Intervals", IEEE Journal of solid-State Circuits, 39(9): 1487-1496, Sep. 2004.

Cho et al. "A 1.5-V 550-μ W 176×144 Autonomous CMOS Active Pixel Image Sensor", IEEE Transactions on Electron Devices, 50(1): 96-105, Jan. 2003.

Culurciello et al. "Arbitrated Address Event Representation Digital Image Sensor", 2001 IEEE International Solid-State Circuits Conference, Digest of Technical Papers, ISSCC 2001, Piscataway, NJ, USA, Session 6: 'CMOS Image Sensors With Embedded Processors', 6.3: 92-93, 2001.

Fish et al. "Wide Dynamic Range Snapshot APS for Ultra Low-Power Applications", IEEE Transactions on Circuits and Systems, II: Express Briefs, 52(11): 729-733, Nov. 2005.

Fossum "CMOS Image Sensors: Electronic Camera-On-A-Chip", IRRR Transactions on Electronic Devices, 44(10): 1689-1698, Oct. 1997.

Hamamoto et al. "A Computational Image Sensor With Adaptive Pixel-Based Integration Time", IEEE Journal of Solid-State Circuits, 36(4): 580-585, Apr. 2001.

Lulé et al. "100000-Pixel, 120-dB Imager in TFA Technology", IEEE Journal of Solid-State Circuits, 35(5): 732-739, May 2000.

McIlrath "A Low-Power Low-Noise Ultrawide-Dynamic-Range CMOS Imager With Pixel-Parallel A/D Conversion", IEEE Journal of Solid-State Circuits, 36(5): 846-853, May 2001.

Stoppa et al. "Novel CMOS Image Sensor With a 132-dB Dynamic Range", IEEE Journal of Solid-State Circuits, 37(12): 1846-1852, Dec. 2002.

Ward et al. "CMOS Photodetector With Built-in Light Adaption Mechanism", Microelectronics Journal, 24(5): 547-553, Aug. 1993.

Wong "CMOS Image Sensors—Recent Advances and Device Scaling Considerations", IEDM, Tech Dig., 8.5.1-8.5.4, p. 201-204, 1997.

Yadid-Pecht "Wide-Dynamic-Range Sensors", Optical Engineering, 38(10): 1650-1660, Oct. 1999.

Yang "A Wide-Dynamic-Range, Low-Power Photosensor Array", 1994 IEEE International Solid-State Circuits Conference, ISSCC94, Session 13: 'Neural Networks and Image Sensors', Paper TP 13.7: 230-231, 1994.

Yang et al. "A 640×512 CMOS Image Sensor With Ultra Wide Dynamic Range Floating-Point Pixel-Level ADC", 1999 IEEE International Solid-State Circuits Conference, ISSCC99, Digest of Technical Papers, Session 17, Paper WA 17.5: 308-309, 471-472, 1999.

Second International Search Report and the Written Opinion Dated Jun. 29, 2010 From the International Searching Authority Re. Application No. PCT/IL2010/000054.

OPTICAL PIXEL AND IMAGE SENSOR

RELATED APPLICATIONS

This Application is a National Phase of PCT Patent Application No. PCT/IL2007/001427 having International filing date of Nov. 19, 2007, which claims the benefit of U.S. Provisional Patent Application No. 60/859,956 filed on Nov. 20, 2006. The contents of the above Applications are all incorporated herein by reference.

FIELD AND BACKGROUND OF THE INVENTION

The present embodiments, in some embodiments thereof, relate to an image sensor based on pixels with reset state information, and more particularly, but not exclusively, to a method for selectively adjusting the integration time of each pixel, while permitting image sensor operation in global shutter mode.

Driven by the demand for low-power dissipation in state-of-the-art portable image systems, CMOS Active Pixel Sensors (APS) have become very attractive. CMOS imagers offer significant advantages in terms of low-power, low-voltage and monolithic integration, thus rivaling traditional charge-coupled devices (1-3).

Sensor dynamic range (DR) is one of the most important figures of merit in state of the art CMOS image sensors. The dynamic range problem exists when trying to capture scenes having a wide range of illumination. Generally, the illumination levels can range from $10^{-3}$ lux for night vision to $10^5$ lux for scenes illuminated with bright sunlight. Even higher levels can occur with the direct viewing of light sources such as oncoming headlights. Bright scenes and wide variations in intra-scene illumination can arise in many situations, such as driving at night, photographing people in front of a window, observing an aircraft landing at night, and imaging objects for studies in meteorology or astronomy. The human eye has a dynamic range of about 90 dB and camera film of about 80 dB, but typical CMOS APS have a dynamic range of only 65-75 dB (4).

Dynamic range insufficiency of conventional video cameras is a serious problem in realizing a robust vision system for images having wide illumination conditions in the same scene. A narrow dynamic range results in the saturation of pixels with high sensitivity during exposure to high illumination levels. Saturation may result in the loss of part of the image information.

Generally, dynamic range is increased in two ways. The first method is noise reduction, which expands the dynamic range toward darker scenes. The second method is incident light saturation level expansion, which expands the dynamic range toward brighter scenes.

Different solutions for increasing the dynamic range in CMOS image sensors have been presented in recent years (5-13). A summary of existing solutions and their comparisons have been presented in O. Yadid-Pecht, "Wide dynamic range sensors", Optical Engineering, Vol. 38, No. 10, pp. 1650-1660, October 1999, which is incorporated herein by reference in its entirety. Generally, these solutions can be divided into five groups:

(a) Companding sensors, such as logarithmic, compressed response photodetectors (e.g. 14);

(b) CMOS multi-mode sensors, where operation modes were changed according to light conditions (e.g. 15);

(c) Frequency based sensors, where the sensor output is converted to pulse frequency (e.g. 16);

(d) External control over integration time for the entire sensor or portions of the sensor, which can be further subdivided to enable global control. Thus, the entire sensor can have different integration times for different frames, or different areas within the sensor can have different integration times (e.g. 13); and (e) Autonomous control over integration time, in which the sensor itself provides the means for selecting different integration times (e.g. 11, 17, 19).

U.S. Pat. No. 6,831,689 by Yadid-Pecht., which is incorporated herein by reference in its entirety, presents a method and apparatus for expanding the dynamic range of a rolling shutter optical imager. The method entails individually controlling the integration time of each pixel of a sensor array, and providing a corresponding scaling factor for the electrical output of each individual pixel. The integration time of each pixel is controlled as a function of light intensity received by each individual pixel and resetting the pixel after a predetermined threshold for the output signal has been reached.

U.S. Pat. No. 6,977,685 by Acosta-Serafini et al., which is incorporated herein by reference in its entirety, presents an imager system provided in a semiconductor substrate. The imager includes a plurality of photosensitive, charge integrating pixels that are arranged in rows and columns of a pixel array, for capturing illumination of a scene to be imaged. Integration control circuitry is connected to access a selected pixel of the array for rolling shutter readout, and to generate pixel-specific integration control signals delivered to the selected pixel, independent of other pixels, based on dynamic range specification input provided by the input interface circuit.

Both U.S. Pat. No. 6,831,689 and U.S. Pat. No. 6,977,685 are applicable to imaging systems operating in rolling shutter mode.

A low-power wide dynamic range (WDR) sensor operating in global shutter mode (also denoted herein snapshot mode) is presented in "Low Power Global Shutter CMOS Active Pixel Image Sensor with Ultra-High Dynamic Range" (12), which is herein incorporated in its entirety by reference. Pixels are selectively reset at intermediate intervals during frame, in order to prevent saturation. An indication of whether the given pixel was reset at the end of the preceding interval is temporarily stored in the same output capacitance which stores the analog optical sensor level for readout.

SUMMARY OF THE INVENTION

Some of the present embodiments are based on a multi-sampling dynamic range expansion approach, and allow efficient global shutter implementation while achieving small pixel size and high fill factor.

An exemplary embodiment of an image sensor is presented. The embodiment includes a pixel array, where each pixel includes an externally-loadable flag which stores the reset state of the pixel. In the preferred embodiment, the flag is stored in an in-pixel memory. Each pixel may also include reset logic, which resets the pixel based on the flag and an externally-applied reset signal.

A non-destructive readout is performed on the array pixels, at a sequence of time intervals during the full integration time. Based on the readout and other pixel information, it is determined whether the pixel will saturate by the end of the full integration time. If it is determined that the pixel will saturate, the pixel's flag is set to "Reset" state. The array pixels are then selectively reset according to the reset state stored in their respective flags, by applying a single array reset signal at the end of each interval. An adaptive exposure time may thus be obtained for each pixel, according to the local illumination intensity level.

Much of the required processing for dynamic range expansion may be performed in the array periphery, while still allowing global shutter operation.

According to an aspect of some embodiments of the present invention there is provided a photosensitive pixel including: a photosensor, configured for outputting a signal indicative of an intensity of incident light and an externally-settable flag, configured for indicating a pixel reset state.

According to some embodiments of the invention, the photosensitive pixel further includes reset logic associated with the photosensor and the flag, configured for resetting the photosensor in accordance with the reset state and an externally applied reset signal.

According to some embodiments of the invention, the photosensitive pixel further includes an in-pixel memory for storing the flag.

According to some embodiments of the invention, the in-pixel memory includes a static memory.

According to some embodiments of the invention, the in-pixel memory includes a single-bit memory.

According to some embodiments of the invention, the photosensitive pixel further includes a memory interface configured for loading the reset state into the flag.

According to some embodiments of the invention, the reset logic is configured to determine if the photosensor should be reset by performing a logic operation on the reset state and the reset signal.

According to an aspect of some embodiments of the present invention there is provided an image sensor including: an array formed from a plurality of photosensitive pixels, array reset input and at least one comparator unit. The photosensitive pixels each include: a photosensor configured for outputting a signal indicative of an intensity of incident light, an externally-settable flag configured for indicating a pixel reset state, and reset logic associated with the photosensor and the flag configured for resetting the photosensor in accordance with the reset state and an externally applied reset signal. The array reset input is configured for inputting an array reset signal and for providing the array reset signal in parallel to the pixels. Each comparator unit is configured for comparing a photosensor readout signal to a threshold, and a logic unit, for determining a reset state of the photosensor in accordance with a result of the comparison, conditional upon the reset of the pixel in the preceding time interval, and for loading the reset state into a flag of a respective pixel.

According to some embodiments of the invention, the comparison is performed at a sequence of progressively shorter intervals.

According to some embodiments of the invention, the image sensor further includes an event recorder, configured for maintaining a respective record of threshold crossing events for each pixel of the array.

According to some embodiments of the invention, the logic unit is configured to determine if the pixel was reset in the preceding time interval in accordance with the respective record of threshold crossing events.

According to some embodiments of the invention, the image sensor further includes a threshold generator configured for setting a respective threshold for each of the intervals to indicate pixels reaching a saturation level prior to a final readout time.

According to some embodiments of the invention, the image sensor further includes processor configured for calculating an output illumination level associated with a given pixel in accordance with a respective record of threshold crossing events and a respective final pixel readout.

According to some embodiments of the invention, the processor is configured to calculate the pixel illumination level as a product of the final pixel readout and a scaling factor derived from the respective record of threshold crossing events.

According to an aspect of some embodiments of the present invention there is provided an image sensor including: an array of photosensitive pixels, each pixel being associated with a pixel flag, a comparator for comparing the output of each pixel to a threshold, and a flag setting unit for setting the flag of each pixel where the threshold is crossed.

According to some embodiments of the invention, the flag setting unit is configured to set the flag only for pixels which were reset in the preceding time interval.

According to some embodiments of the invention, the threshold is set to indicate pixels reaching a saturation level.

According to some embodiments of the invention, the comparator is configured to perform the comparison at a sequence of progressively shorter intervals.

According to some embodiments of the invention, the image sensor further includes a reset unit configured to reset any pixel whose flag is set, thereby to allow the pixel to continue integration from zero.

According to an aspect of some embodiments of the present invention there is provided a method for controlling pixel exposure time in an image sensor, including: exposing a pixel array to light for an integration time, wherein each pixel of the array is associated with a respective flag indicative of a pixel reset state, performing a non-destructive readout of the pixels at a sequence time intervals within the integration time, determining after each non-destructive readout, for each of the pixels, if the pixel is liable to saturate prior to a final readout, if a pixel is liable to saturate, setting a respective flag and updating a respective record of threshold crossing events, and simultaneously resetting pixels whose flag is set to continue light integration from a zero state.

According to some embodiments of the invention, the intervals are a progressively decreasing sequence.

According to some embodiments of the invention, the method includes the further step of storing the respective flag internally in the pixel.

According to some embodiments of the invention, the performing a non-destructive readout comprises: enabling rows of the array in turn, and determining pixel output levels of each of the rows during enablement, thereby to perform the readout on a row by row basis.

According to some embodiments of the invention, the method includes the further step of performing a final readout of each of the pixels, setting all of the flags to reset state, and applying a reset signal in parallel to all of the pixels.

According to some embodiments of the invention, the method includes the further step of calculating a respective pixel illumination level in accordance with a respective pixel reset count and a respective final pixel readout.

According to some embodiments of the invention, the calculating comprises multiplying the respective final pixel readout and a scaling factor derived from the respective external memory count.

According to some embodiments of the invention, the determining comprises comparing a readout level to a specified threshold.

According to some embodiments of the invention, the determining is conditional upon the reset of the pixel in the preceding time interval.

According to some embodiments of the invention, the method invention includes the further step of selecting the specified threshold in accordance with a length of a current time interval.

According to some embodiments of the invention, the method includes the further step of selecting the specified threshold in accordance with a readout time of the pixel relative to other pixels of the array.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE PREFERRED EMBODIMENTS

Figure 1:
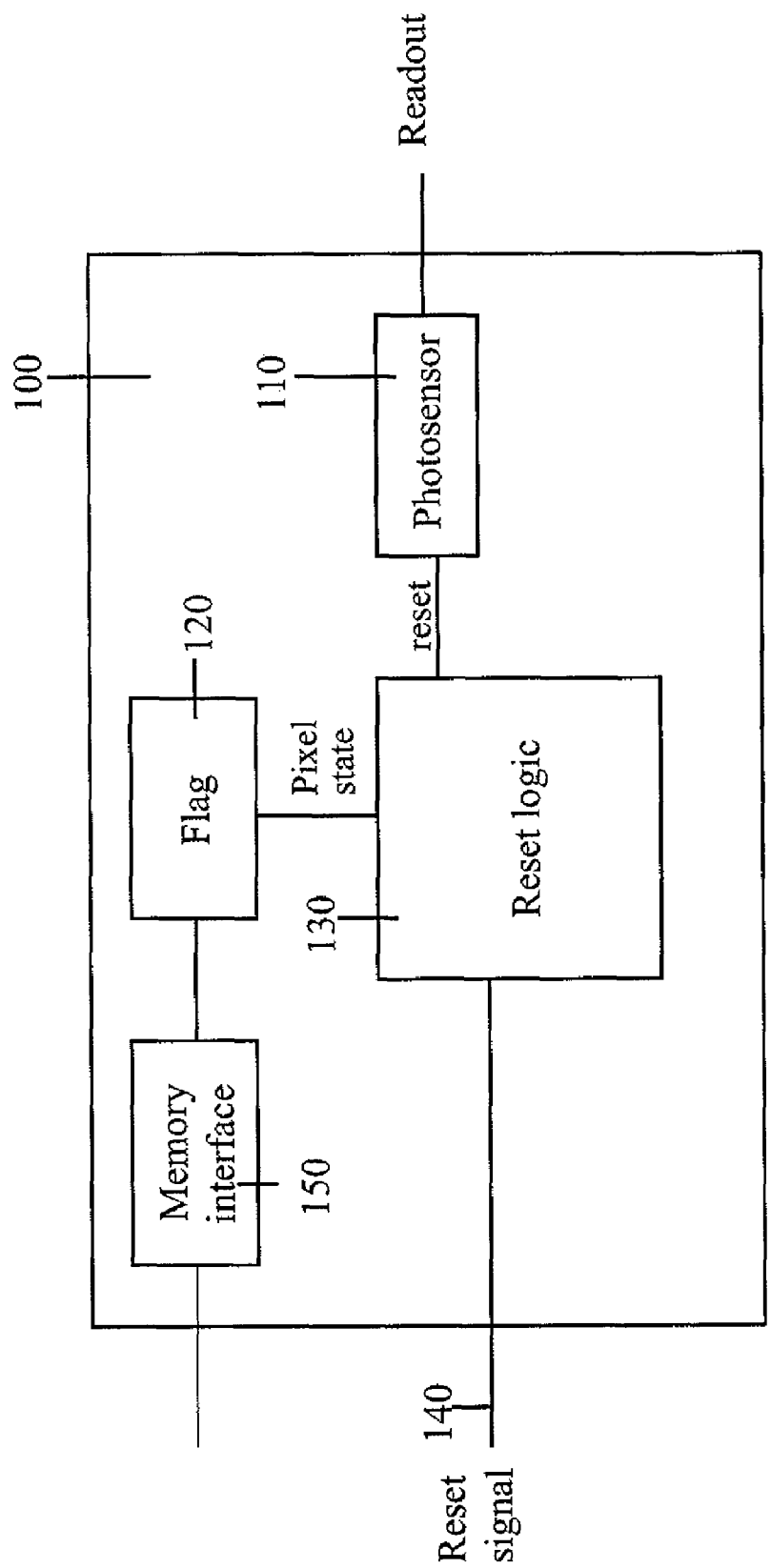
FIG. 1 is a simplified block diagram of a photosensitive pixel, according to a preferred embodiment of the present invention.

The present embodiments, in some embodiments thereof, relate to an image sensor based on pixels with reset state information, and more particularly, but not exclusively, to a method for selectively adjusting the integration time of each pixel, while permitting image sensor operation in global shutter mode.

In order to selectively adjust the respective integration time for each pixel, the full integration time for the frame is subdivided into intervals, preferably in a sequence of progressively shorter intervals. At the end of each interval, a non-destructive readout of the pixels is performed, and the readout level of each pixel is compared to a respective threshold. Based on the comparison result, it is determined if the pixel will saturate before the end of the frame. If it is determined that the pixel will saturate, the pixel is reset.

Resetting the pixel at an intermediate point during the integration period reduces the probability that the pixel will saturate prior to the final readout. The incident light intensity may then be calculated at the end of the integration period, typically by multiplying the final readout level by a scaling factor which is based on the length of time since the last reset. This length of time may be determined from a knowledge of how many times the given pixel was reset over the entire integration period.

The principles and operation of a photosensitive pixel, an image sensor comprising an array of photo sensitive pixels and of a method for controlling pixel exposure time according to the present invention may be better understood with reference to the drawings and accompanying descriptions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In the following, parts that are the same as those in previous figures are given the same reference numerals and are not described again except as necessary for an understanding of the present embodiment.

Some of the embodiments presented below are directed at photosensor with electron integration, in which the voltage decreases over time. Embodiments are possible for different types of photosensors, which provide a cumulative response to incident light over the exposure period. For example, in an alternate embodiment the process is implemented "in reverse" for photosensors in which the readout voltage increases over time. The photosensor readout voltage is then compared to an appropriate sequence of thresholds, to determine whether the readout voltage is higher than the current threshold.

The present embodiments provide a respective flag for each pixel. The flag provides reset state information for the pixel, which indicates whether or not the pixel should be reset. The reset state relates only to the current interval within the frame, and typically requires only a single bit of information. The reset state therefore differs from a cumulative indication of all of the times at which the pixel was reset during the entire frame, which requires multiple bits of information.

Reference is now made to FIG. 1, which is a simplified block diagram of a photosensitive pixel, according to a preferred embodiment of the present invention. Pixel 100 includes photosensor 110 and flag 120, and may further include reset logic 130.

Photosensor 110 outputs a signal indicative of an intensity of incident light. Photosensor 110 is preferably a photodiode, but other types of photosensors may be used. The following types of photosensors may be used: photodiodes, photogates, metal-oxide semiconductor (MOS) capacitors, positive-intrinsic-negative (PIN) photodiodes, a pinned photodiodes, avalanche photodiodes, microbolometers or any other suitable photosensitive element. Some photosensors may require changes in the pixel structure.

Flag 120 is an externally-settable indicator of whether or not the pixel is in "Reset" state. As described in greater detail below, the decision of whether or not flag 120 should be set (i.e. the pixel placed in "Reset" state) for a current interval is made by performing a non-destructive readout of photosensor 110 at the end of the interval, and comparing the readout signal to a threshold. The threshold is selected so that if the pixel readout has crossed a threshold, the pixel is expected to saturate (or approach saturation) before the end of the full integration time. In this case flag 120 is set. If the threshold has not been crossed, flag 120 remains clear (i.e. pixel in "No Reset" state).

In some embodiments, flag 120 is stored in an in-pixel memory. In the preferred embodiment the in-pixel memory is a one-bit memory for storing only flag 120. In alternate embodiments, the in-pixel memory is a larger memory which stores additional information.

Figure 13A:
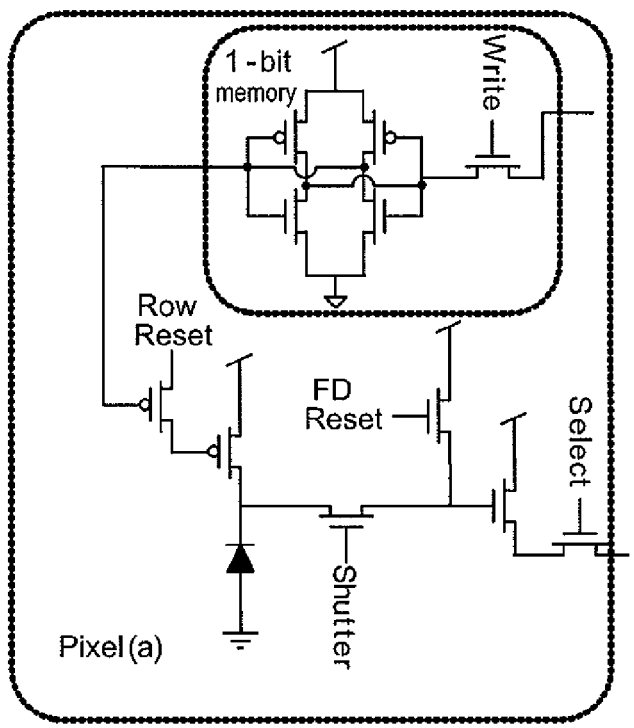
FIGS. 13a and 13b are exemplary circuit diagrams of a pixel with static and dynamic in-pixel memories respectively.

Preferably the in-pixel memory is a static memory, which may permit a simpler pixel design, possibly with no need to include refresh circuitry in the pixel. An exemplary embodiment of a pixel with a one-bit in-pixel static memory for storing flag 120 is shown in FIG. 13a.

In an exemplary embodiment, pixel 100 further includes reset logic 130, which determines whether the photosensor should be reset. The decision is based on the value of flag 120 when a reset signal received at reset input 140. Reset logic 130 may be a logic element, such as an AND gate (see Table 1).

By storing reset state information for each pixel of the array, a pixel array may be reset simultaneously in a selective manner. A single "Array Reset" signal applied in parallel to the reset inputs of multiple pixels will reset only those pixels whose flag is set (i.e. in "Reset" state). Pixels whose flag is clear (i.e. in "No reset" state) will continue with integration.

A single bit flag is sufficient for indicating the pixel reset state, because only pixels that were reset at the preceding time interval are candidates for reset at the following time interval. For such a pixel it has already been determined that the pixel will not saturate before the final readout is performed. In fact, a comparison between the readout level of the given pixel and the threshold may yield incorrect results, since the pixel has continued to integrate light without being reset.

Figure 2:
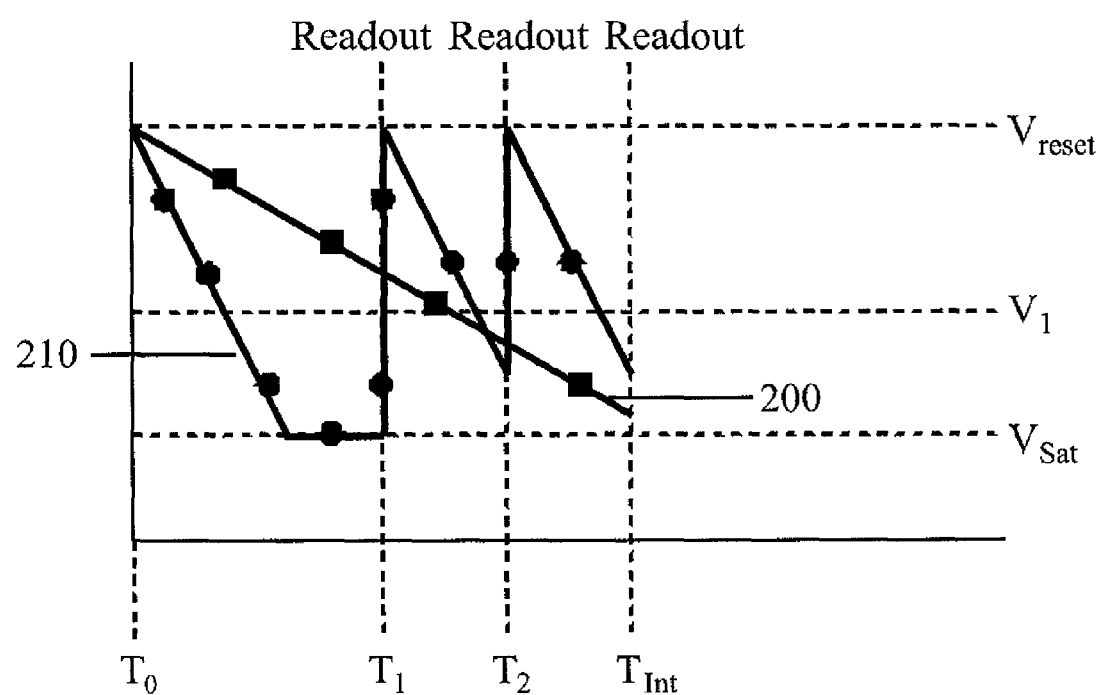
FIG. 2 is a simplified graph illustrating that pixels which were not reset at a preceding time interval are not candidates for reset at subsequent intervals of the given frame.

Reference is now made to FIG. 2, which illustrates why pixels which were not reset at the preceding time interval are not candidates for reset at subsequent intervals of the given frame. FIG. 2 shows the outputs of two photosensor, 200 and 210. Photosensor 200 discharges at a slower rate that photosensor 210.

At the beginning of the integration period both pixels are set to $V_{reset}$. Both pixels are read out after the first time interval, $T_1$, and compared with threshold $V_1$. Since pixel 200 has not crossed the threshold it is not reset, and continues to discharge. In contrast, pixel 210 has crossed the threshold, and is therefore reset to $V_{reset}$.

At $T_2$ both pixels are readout again, and compared to threshold $V_1$. It is correctly determined that pixel 210 will saturate before the final readout, and pixel 210 is reset. However, if the readout of pixel 200 is compared with $V_1$ it is incorrectly determined that pixel 200 will saturate. This is due to the fact that pixel 200 has been discharging over the entire time period $T_2$, whereas the threshold $V_1$ is appropriate for pixels which have been discharging over a shorter time interval.

In the preferred embodiment, reset logic 130 determines if the pixel should be reset by performing a logic operation on the reset state information and the reset signal.

In one embodiment reset logic 130 performs an AND operation upon the pixel reset state (indicated by the pixel's flag) and the input reset signal, as shown in Table 1.

TABLE 1

|  | Reset State = "Reset" | Reset State = "No reset" |
| --- | --- | --- |
| Reset Signal = '1' | YES | NO |
| Reset Signal = '0' | NO | NO |

In some embodiments, pixel 100 includes memory interface 150 through which the reset state information is input and loaded into flag 120. Thus the decision whether the pixel should be placed in "Reset" state or "No reset" state may be made outside the pixel, and loaded into flag 120 prior to the array reset. In order to reset the entire pixel array after the final readout, all the in-pixel memories are placed into "Reset" state, and the Array Reset signal is applied. Additionally or alternately, pixel 100 includes an input interface for receiving the external reset signal into reset logic 130.

In some embodiments pixel 100 includes a readout portion for storing an analog signal which is indicative of the level of photosensor 110. The pixel may be designed to provide parasitic capacitances which serve to maintain the analog signal until readout is performed.

The above-described pixel with flag may be formed into an array, and incorporated into an image sensor.

Figure 3:
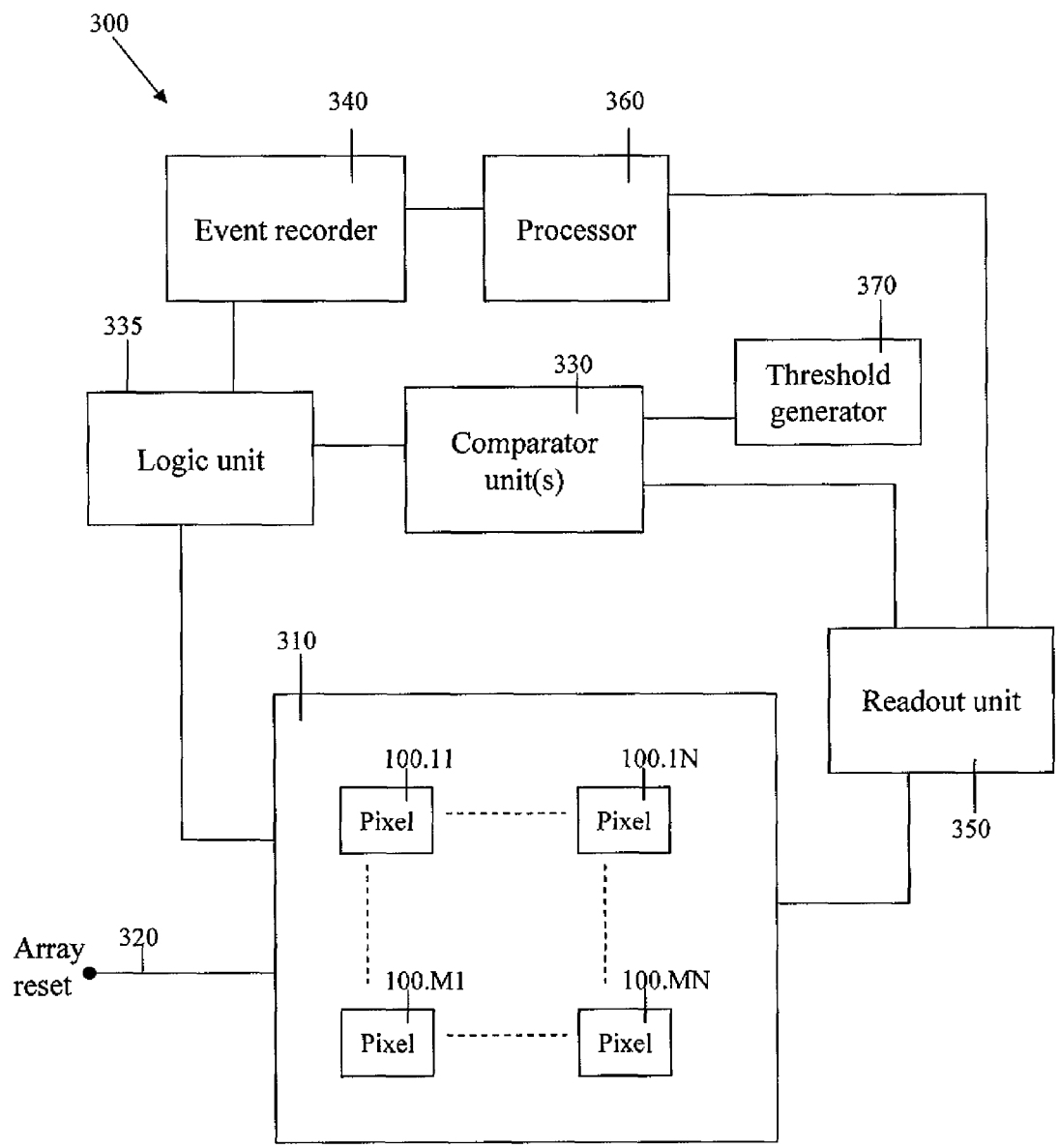
FIG. 3 is a simplified block diagram of an image sensor, according to a first preferred embodiment of the present invention.

Reference is now made to FIG. 3 which is a simplified block diagram of an image sensor, according to a first preferred embodiment of the present invention. Image sensor 300 includes pixel array 310, comparator unit 330 and logic unit 335. In some embodiments image sensor 300 further includes event recorder 340.

Pixel array 310 is an N×M array of pixels 100. In the preferred embodiment, each pixel 100 includes a photosensor and flag, and may include reset logic, substantially as described above. In an alternate embodiment, dynamic range expansion may be required only for a portion of the array. Pixels within that portion include a flag and reset logic. Pixels outside the portion may have a simpler (or different) configuration, which does not include a flag. The following discussion is directed to an image sensor in which all pixels have the architecture of pixel 100. It is to be understood that pixel array 310 may be a portion of a larger array formed of pixels with differing architectures.

Array reset input 320 is an input for receiving the array reset signal. The array reset signal is provided in parallel to the reset logics.

Image sensor 300 includes one or more comparator units 330. A comparator unit 330 compares a pixel readout signal to a threshold. The result of the comparison indicates whether the selected pixel is or is not expected to saturate before the final readout.

Logic unit 335 determines whether the pixel should or should not be reset as a result of the current readout. In other words, logic unit 335 determines whether the selected pixel should be placed in "Reset" or "No reset" state. If the threshold was crossed and the pixel was reset in the preceding interval, logic unit 335 selects the "Reset" state for the pixel. Otherwise, logic unit 335 selects the "No reset" state for the pixel. Logic unit 335 loads the reset state into the respective flag, and preferably provides the result of the comparison to event recorder 340.

In the preferred embodiment, image sensor 300 is organized in a column parallel architecture and a respective comparator unit and respective logic unit(s) are provided for each column of the array, as described in more detail for FIG. 4 below.

Event recorder 340 stores maintains a respective record of threshold crossing events (denoted herein the reset record) for each pixel of the array. The reset record indicates all of the intervals at which the pixel was reset during the current frame. For example, the reset record may be a cumulative count of the number of resets the pixel has undergone during the current integration period. In another example, the reset record is a sequence of bits, where each bit is associated with a given time interval. A value of '1' may indicate that the pixel was reset at the end of the associated time interval, whereas a value of '0' may indicate that the pixel was not reset at the end of the associated interval.

In the preferred embodiment, logic unit 335 determines whether a given pixel was or was not reset in the preceding time interval from the pixel's respective reset record, obtained from event recorder 340.

Note that in a simple embodiment, pixel readout may be performed at a single intermediate time point during the full integration time. The phrase "sequence of progressively shorter intervals" is intended to cover the case in which the sequence consists of a single interval, resulting in a single intermediate readout and comparison to threshold.

After the final readout, event recorder 340 clears all the reset records to zero, in preparation for the next integration period.

Processor 360 calculates the incident light intensity for each pixel, based on the final pixel readout and the respective reset record. Processor 360 may perform additional functions, such as generating the array reset signal, setting the pixel flags to "Reset" to enable resetting the array at the end of the integration period, and/or clearing the pixel flags prior to beginning the subsequent integration period.

In the preferred embodiment, the respective light intensity is obtained by multiplying the pixel readout value by a scaling factor derived from the pixel's reset record. The scaling factor is preferably calculated from the length of time that has passed since the previous pixel reset. This length of time may be derived from the value of the pixel's reset record, as described below. In other embodiments a respective scaling factor is specified for each value of the reset record.

A non-limiting exemplary embodiment is presented of an algorithm for integration time control and output level calculation. The exemplary algorithm is implemented in a column-parallel manner on the array pixels. The instant algorithm is for an image sensor operating in global shutter operation, but may be adapted to rolling shutter operation.

In the present embodiment, the required expansion of the dynamic range is determined by a series of W-bits. The full integration time is subdivided into W intervals, which are progressively shorter according to the decreasing series:

$$T_{INT}/X^1, T_{INT}/X^2, \ldots, T_{INT}/X^W \quad (1)$$

where X>1 and $T_{INT}$ represents the full integration time.

At the beginning of the frame, all pixels in the image sensor are reset simultaneously to ensure global shutter operation of the image sensor (also denoted herein the imager). Then the photodiode (i.e. photosensor) output of each pixel in row k is compared with an appropriate threshold, at time points given by:

$$T_{INT}-(T_{INT}/X^1)-\Delta t_k, \ldots, T_{INT}-(T_{INT}/X^W)-\Delta t_k \quad (2)$$

where $\Delta t_k$ is a time associated with row k and given as:

$$\Delta t_k = (N-k+1) \cdot T_{decision} \quad (3)$$

Where $T_{decision}$ is the decision time and is described later on.

The comparison is performed by enabling a column shared comparator with constant threshold value $V_{th}$ to all pixels in the array, in a row-by row manner. Each comparator performs a comparison for a single pixel in the current row. The comparison is performed on all rows, one at a time. The comparison determines whether the pixel in the given column of the enabled row is going to be saturated at the next integration slot. This binary information is saved locally for the each pixel in the respective flag, and is also sent to an external digital memory in a different part of the sensor.

If any of the comparisons determines that the pixel will saturate at the end of the current interval, the pixel is reset by applying a reset signal to the pixel. The pixel is then allowed to start integrating light again, but for a shorter period of time. Note that the reset is applied simultaneously to all pixels in array to guarantee snapshot mode. This enables proper scaling of the value being read out, and enables the pixel value to be described in a floating-point representation.

The pixel value is calculated as:

$$\text{Value} = Man \cdot \left(\frac{T_{INT}}{T_{INT}/X^{EXP}}\right) = Man \cdot X^{EXP} \quad (4)$$

where Value is the actual pixel value, Man (Mantissa) is the analog or digitized output value that has been read out at the time point $T_{INT}$, EXP is the exponent value, that is stored in the digital memory block and describes the scaling factor (i.e. which part of the full integration time is actually effective.) The exponent value is retrieved from digital memory at the end of overall integration period, $T_{INT}$.

Image sensor 300 preferably includes threshold generator 370, for inputting selected thresholds into one or more comparator unit(s). Considerations for selecting a threshold are discussed in below.

In the preferred embodiment, image sensor 300 further includes readout unit 350 which performs readout of the pixel array, preferably on a row by row basis.

In the preferred embodiment, the image sensor is organized in column-parallel architecture. A comparator and/or readout circuit are provided for each column of the pixel array. Pixel readouts and comparisons are performed on a row by row basis.

Figure 4:
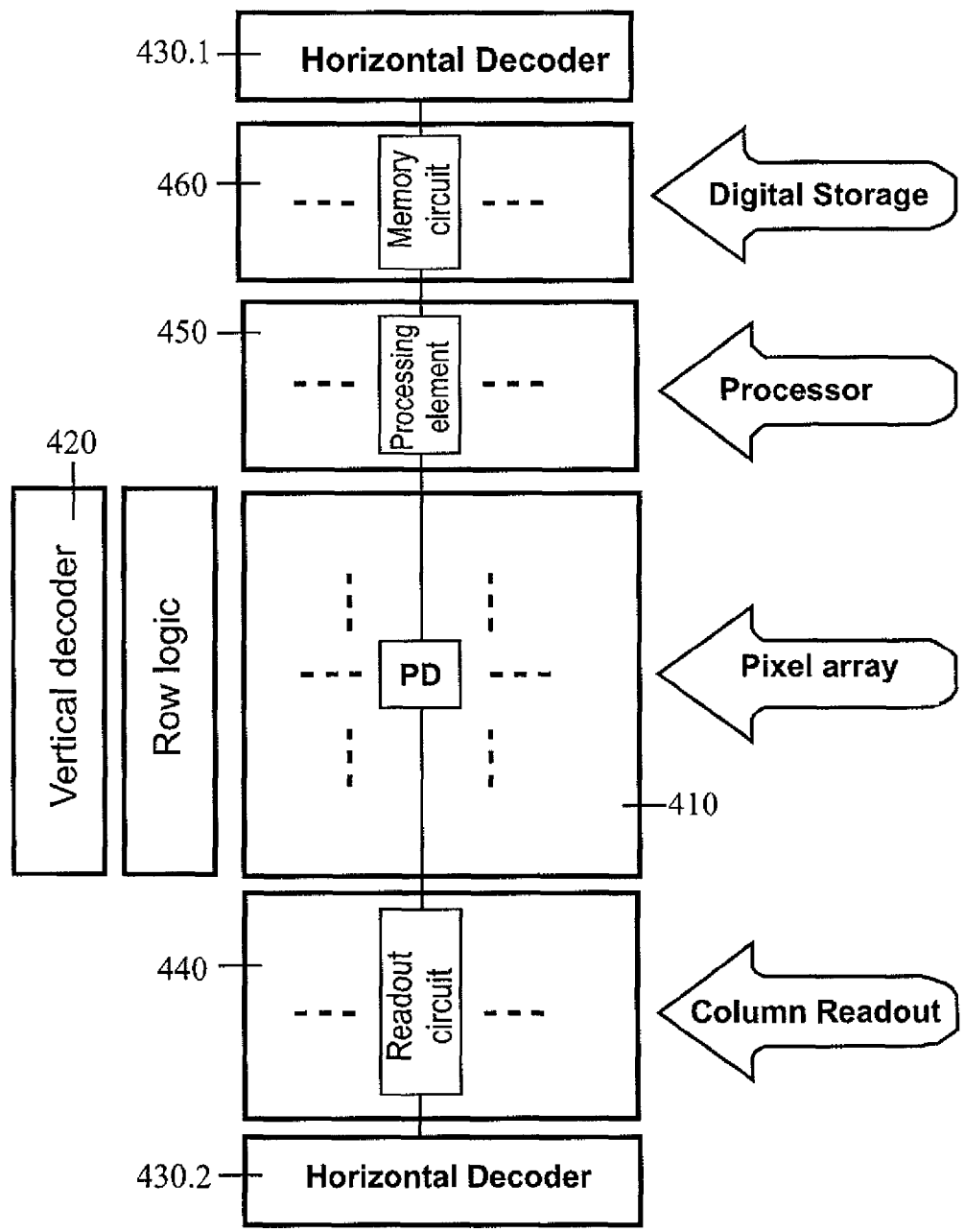
FIG. 4 is a simplified block diagram of a column-parallel image sensor with global shutter operation, according to a preferred embodiment of the present invention.

Reference is now made to FIG. 4, which is a simplified block diagram of a column-parallel image sensor with global shutter operation, according to a preferred embodiment of the present invention. The image sensor includes pixel array 410 (preferably APS), one row (vertical) decoder 420 with row logic, two column (horizontal) decoders 430.1 and 430.2, column readout circuits 440, processing element 450, and external memory array 460. Each pixel in pixel array 410 contains a 1-bit memory cell for storing a flag, that allows the possibility of independent reset of each pixel. The image sensor is thus able to adjust the integration interval for each pixel, and nondestructive readout of the pixel may be performed at any time during the integration period.

Processing element 450 contains the saturation detection circuitry that is shared by all pixels in a column. Because of this column parallel architecture, pixel array 410 contains only a small amount of additional circuitry and there is little sacrifice of fill factor.

Figure 5:
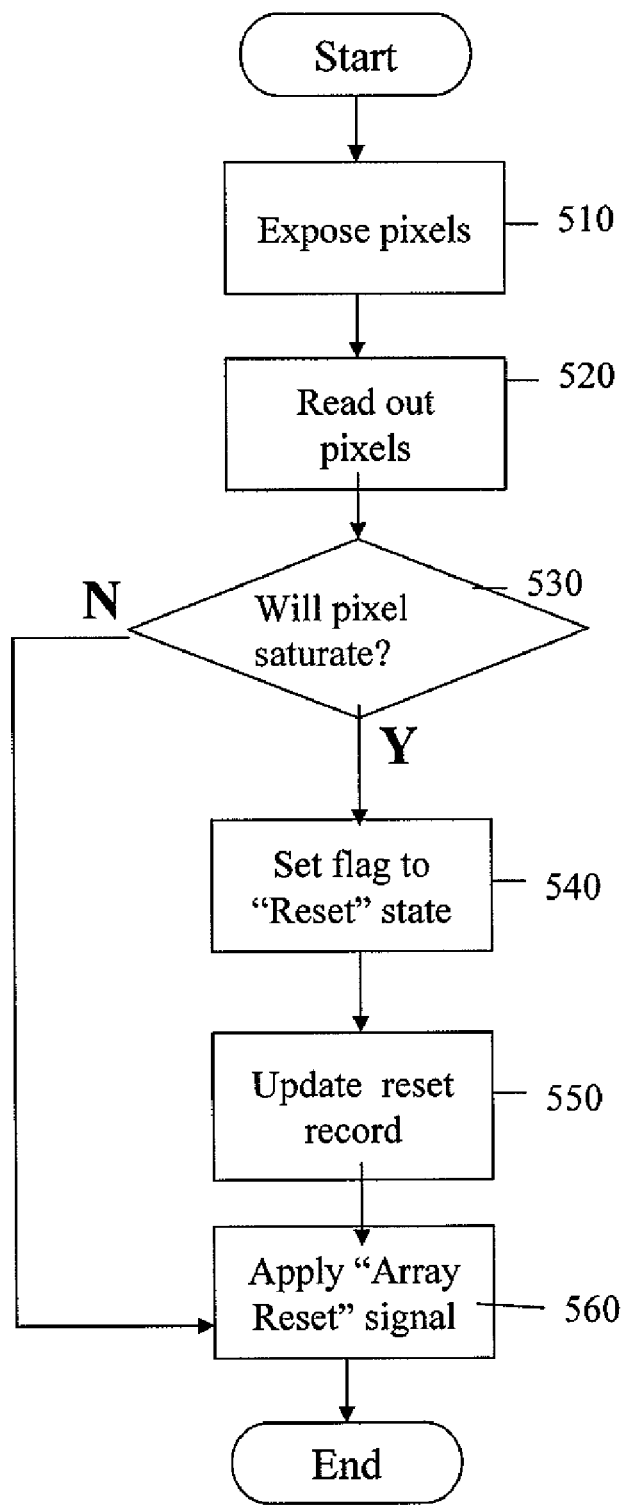
FIG. 5 is a simplified block diagram of a method for controlling pixel exposure time in an image sensor, according to a preferred embodiment of the present invention.

Reference is now made to FIG. 5, which is a simplified block diagram of a method for controlling pixel exposure time in an image sensor, according to a preferred embodiment of the present invention. The method is described for a single time interval. If the integration time is divided into multiple intervals, the steps are repeated for each interval.

In 510 a pixel array is exposed to light. Each of the pixels is associated with a flag for storing pixel reset state information. Preferably the flag is stored in an in-pixel memory, which may be a static memory.

A non-destructive readout of the pixels in the array is performed at a sequence of time intervals 520, preferably of progressively decreasing lengths. After each non-destructive readout, it is determined if the pixel will saturate prior to the final readout at the end of the integration period 530, preferably by comparing the readout level to an appropriate threshold. If the threshold was crossed and the pixel was reset in the preceding time interval, the pixel will saturate.

In the preferred embodiment, the readout is performed on the pixel array on a row by row basis. The pixel array rows are enabled in turn, and the output levels of the pixels in the enabled row are read out.

If it is determined that the photosensor will saturate, the respective flag is set to "Reset" state 540, and the respective pixel's reset count is updated 550.

In 560 the array pixels whose flags are set to "Reset state" are simultaneously reset, substantially as described above.

Figure 6:
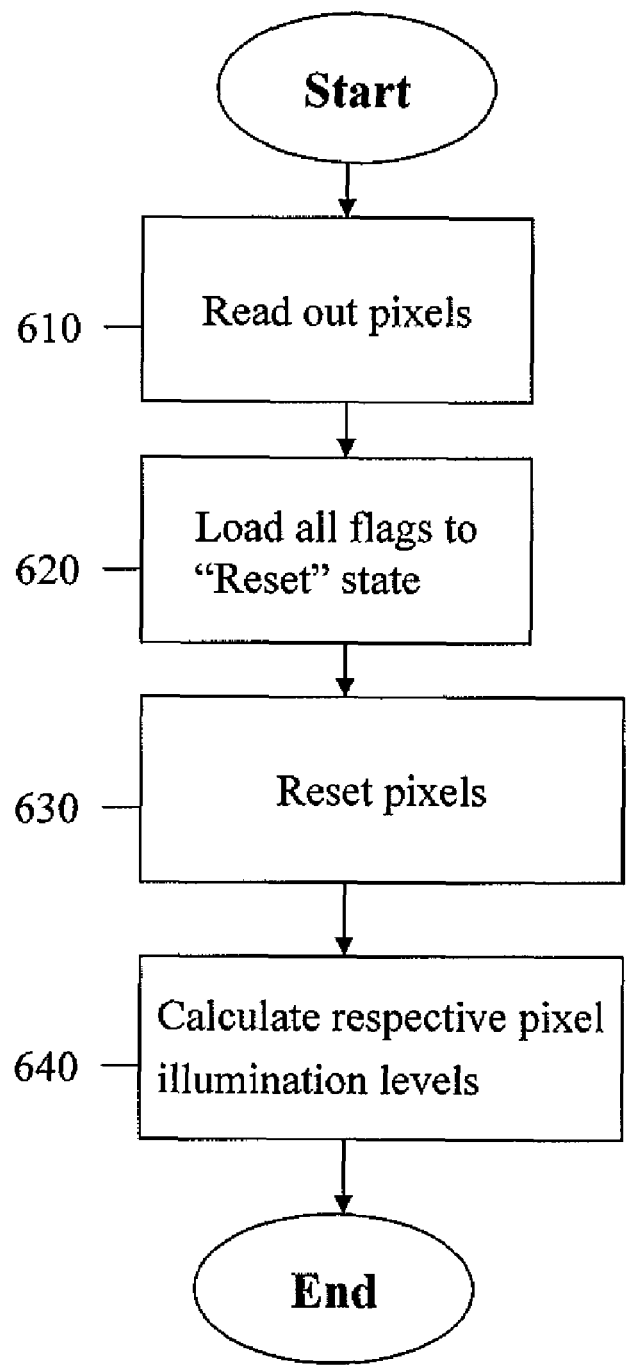
FIG. 6 is a simplified flowchart of a method for final readout and processing of the sensor at the end of the integration period, according to a preferred embodiment of the present invention.

Reference is now made to FIG. 6, which is a simplified flowchart of the final readout and processing at the end of the full integration period, according to a preferred embodiment of the present invention.

In 610, a final readout of each of the pixels is performed. The final readout is preferably performed before the first interval of the following frame (i.e. within $T_1$).

In 620, all of the in-pixel memories are loaded to reset state. At 630 a reset signal is applied in parallel to all the pixels.

In a further preferred embodiment, at 640 a respective pixel illumination level is calculated for each of the pixels. Preferably, the respective pixel illumination level is calculated in accordance with the respective reset record and the respective final pixel readout. More preferably, the calculation is performed by multiplying the respective final pixel readout by a scaling factor derived from the respective reset record (see for example Eqn. 4).

Threshold Considerations

In the preferred embodiment, a single threshold is selected, which is suitable for all pixels and comparators in the sensor, and for all readout intervals.

In another embodiment, a respective threshold is selected for each readout interval during the integration period, based on the relative lengths of each of the intervals in the sequence.

In an additional or alternate embodiment, the threshold is selected respectively on a per-row basis or per-pixel basis. The thresholds may be selected to overcome differences due to issues such as differences in the times at which each row/pixel is read out, and in comparator offset levels.

Threshold selection is performed to avoid the effect of pixel saturation. As previously mentioned, the algorithm checks a threshold point after the first non-final readout period (e.g. $T_{INT}-(T_{INT}/X^1)$), and makes a decision whether it is anticipated that the pixel will be saturated at the end of the integration period. Therefore, the intrinsic threshold value $V_{th\_i}$ is preferably chosen so that the pixel voltage will not descend below the threshold value before TINT. The intrinsic threshold is the threshold for the theoretical case in which $\Delta t_k=0$ and the comparator has no offset.

In the preferred embodiment, the pixel discharge is modeled as a straight line from $V_{reset}$ (photodiode reset voltage) at zero time to threshold voltage $V_{th\_i}$ at $T_1$ (the first sub-integration period).

Figure 7:
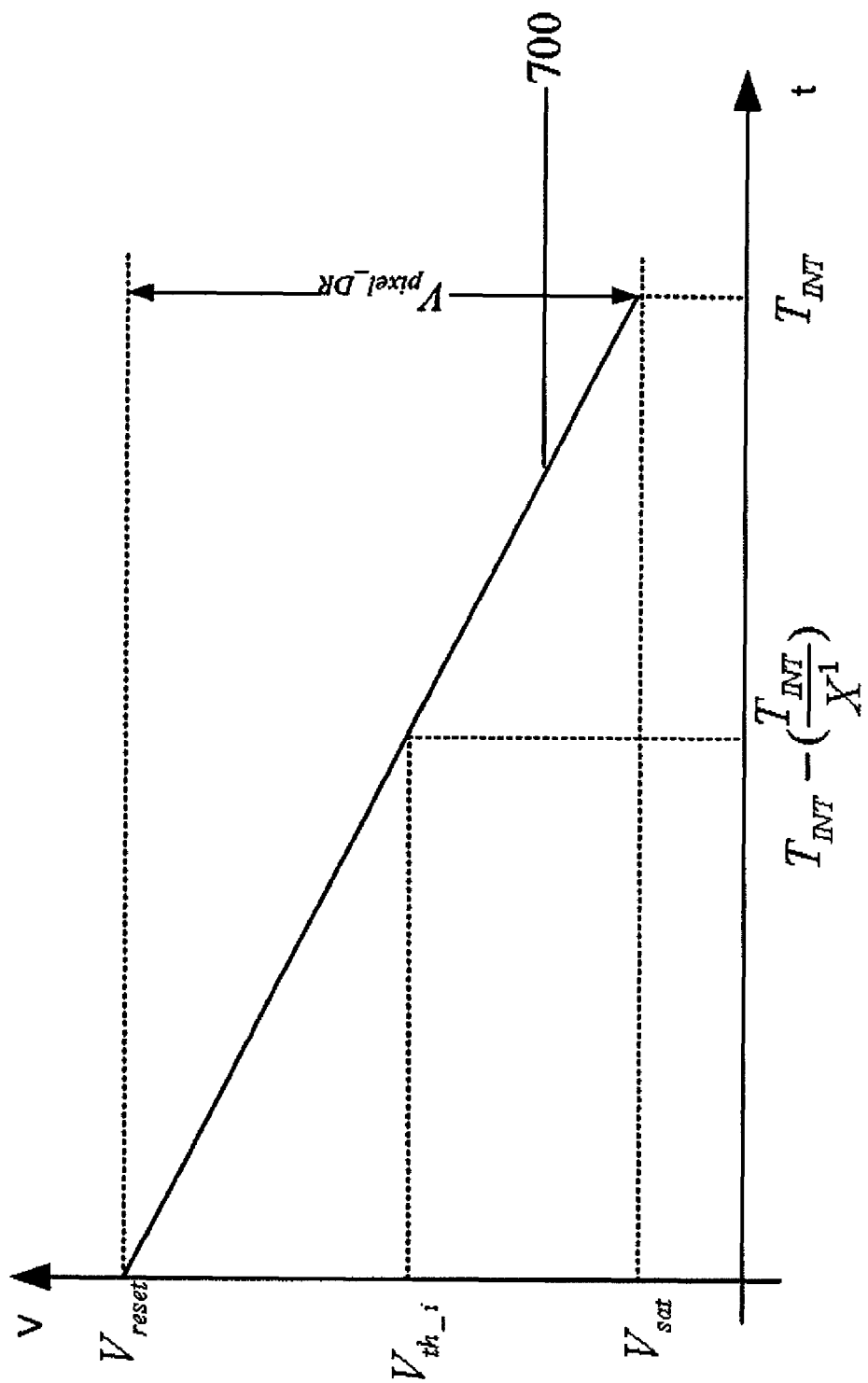
FIG. 7 is a simplified graph illustrating considerations for threshold selection.

FIG. 7 illustrates that the threshold is preferably selected to that the line does not cross voltage $V_{sat}$ before $T_{INT}$. $V_{pixel\_DR}$ is a maximum pixel voltage swing, or, in other words, the difference between $V_{reset}$ and $V_{sat}$ values.

The equation of the straight line 700 is given by:

$$V(t) = V_{reset} - \frac{V_{pixel\_DR}}{T_{INT}} t \quad (5)$$

To find the value of the intrinsic threshold voltage $V_{th\_i}$, $T_{INT}-(T_{INT}/X^1)$ is substituted into the line equation, resulting in the Eqn. 6:

$$V_{th\_i} \geq \frac{V_{pixel\_DR}}{X^1} + V_{sat} \quad (6)$$

Figure 8:
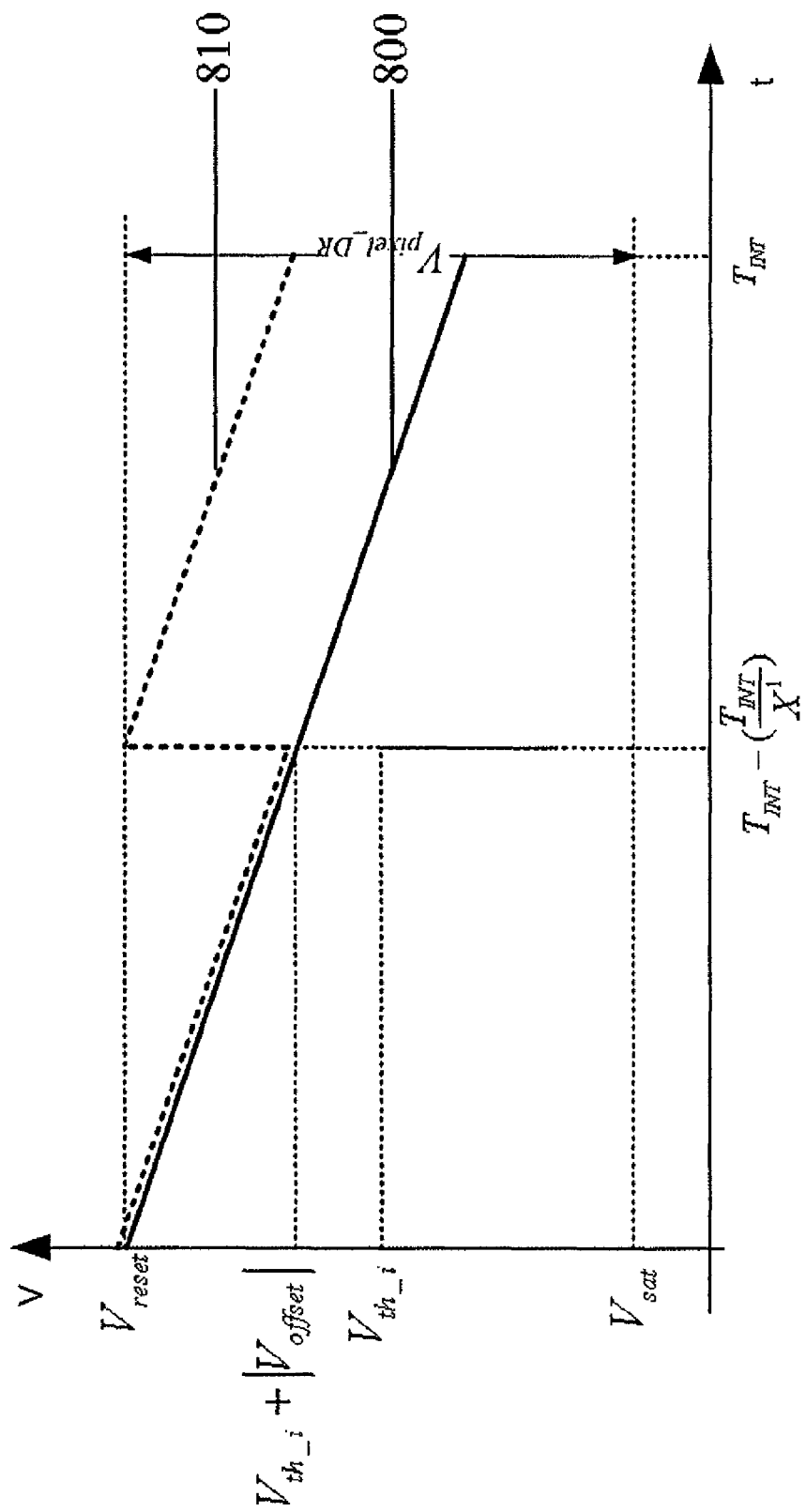
FIG. 8 is a simplified graph illustrating a respective pixel output after processing by two comparators having different offset values.

In real designs each comparator has its own offset voltage. Therefore, for two different comparators having two different offset voltages the comparison will be performed at different points even the same threshold voltage $V_{th\_i}$ was set. FIG. 8 shows an example of two pixels discharging at the same illumination level, and being processed using two comparators having different offset values. The same $V_{th\_i}$ was applied for both cases.

As can be seen, there is immunity to the change in comparator offsets, since in both cases the final results are the same. In the first case (line 800), the pixel value did not pass the threshold voltage $V_{th\_i}$ and therefore the pixel was not reset at the first check. In the second case (dashed line 810), the pixel value did pass the threshold voltage $V_{th\_i}+|V_{offset}|$, and therefore the pixel was reset at the first check.

Nonetheless, the final results (see Eqn. 4) remain similar for both cases. However, in the second case, the SNR of the pixel is reduced since the integration time was reduced.

As mentioned, due to mismatches in fabrication process each comparator typically has its own offset voltage. This offset may be taken in account when the threshold voltage is calculated. The threshold voltage $V_{th}$ may then be given by:

$$V_{th} = V_{th\_i} + |V_{offset}| \quad (7)$$

In the present global shutter WDR algorithm implementation there is a certain delay between the comparison times of different rows. Eqn. 3 shows that the difference in time between row k and row i is given by ($\Delta t_k - \Delta t_i$). Although the comparison is done in row by row manner the final result is not affected.

The reason for this immunity to comparison time differences can be explained by the fact that the difference in comparison times may be considered similarly to the difference in comparator offsets. If the pixel values in row i are compared to $V_{th}$ at $T_1$ and the pixel values in row k are compared to $V_{th}$ at $T_k$ using the same comparator, this is similar to the case where the pixels in both rows are compared at the same time T, but using different comparators having different offsets voltages $V_{offset\_i}$ and $V_{offset\_k}$. This results in different $V_{th}$ (i.e. $V_{th\_i}$ and $V_{th\_k}$) for each row.

Figure 9:
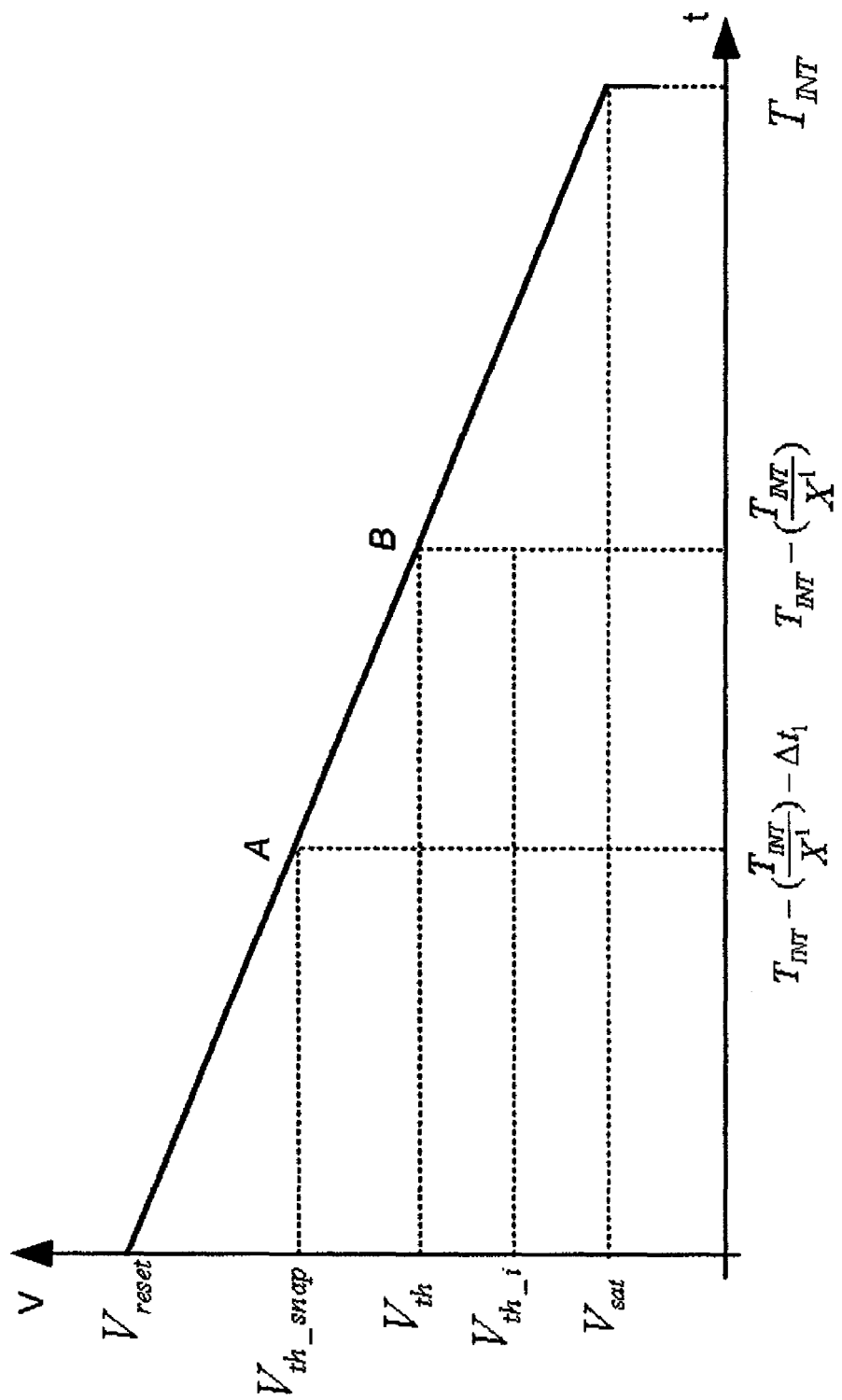
FIG. 9 simplified graph illustrating threshold voltage considerations for a sensor array operated in global shutter mode.

FIG. 9 illustrates threshold voltage considerations for a sensor array operated in global shutter mode. The threshold voltage $V_{th\_snap}$ for the pixel array (operated in snapshot mode) is chosen to be higher than $V_{th}$ in order not to allow saturation of pixel A in the first row and of pixel B in the last row during a single saturation detection check $\Delta t_N$. The total time required for the saturation detection process is ($\Delta t_1 - \Delta t_N$) for all rows in an NxM array, where N is the number of rows and M is the number of columns.

By substituting value of $V_{th\_p}$ from equation 7 into the following equation:

$$\frac{V_{pixel\_DR} - V_{th\_snap}}{V_{pixel\_DR} - V_{th}} = \frac{T_{INT} - \left(\frac{T_{INT}}{X^1}\right) - \Delta t_1}{T_{INT} - \left(\frac{T_{INT}}{X^1}\right)} \quad (8)$$

we obtain a $V_{th\_snap}$ value:

$$V_{th\_snap} \geq V_{th} + \frac{\Delta t_1 (V_{pixel\_DR} - V_{th})}{T_{INT} - \frac{T_{INT}}{X^1}} \quad (9)$$

where $V_{th}$ is given by equation 7 and $\Delta t_1$ is defined in equation 3.

On the other hand, each row may be used with its respective appropriate threshold voltage, as shown in Eqn. 10:

$$V_{th\_snap\_k} \geq V_{pixel\_DR}\left(\left(-\frac{\Delta t_k}{T_{INT} - \left(\frac{T_{INT}}{X^1}\right)}\right)(1 - V_{th}) - V_{th}\right) \quad (10)$$

In another embodiment of the image sensor, the pixel reset information is not stored for each pixel respectively in a flag. Instead an internal memory array is provided for storing respective reset state information for each of the photosensors.

Figure 10:
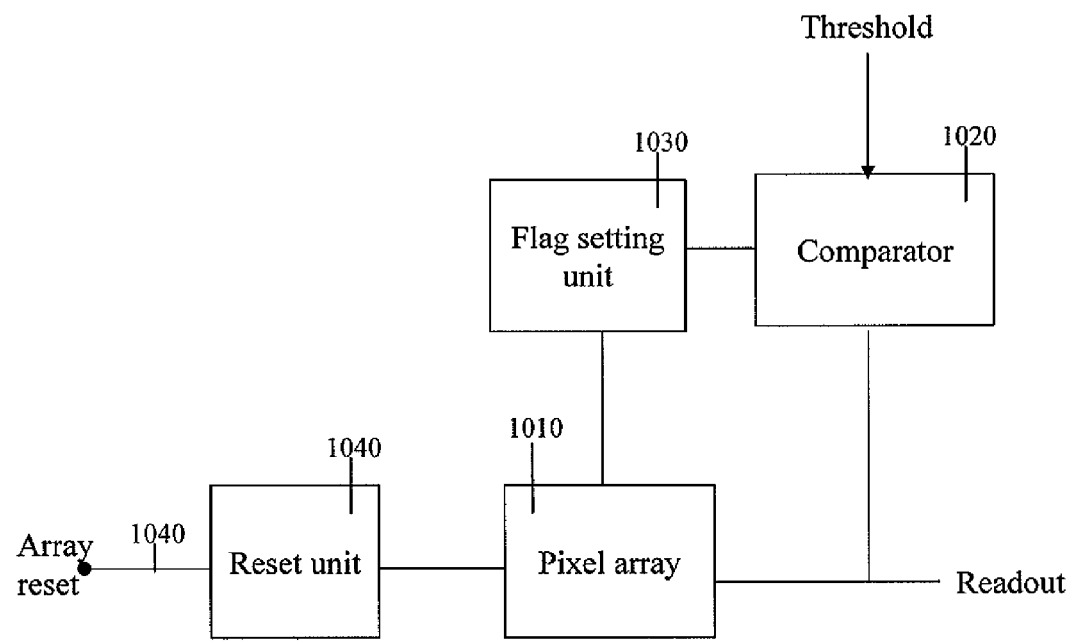
FIG. 10 is a simplified block diagram of an image sensor, according to a second preferred embodiment of the present invention.

Reference is now made to FIG. 10, which is a simplified block diagram of an image sensor according to a second preferred embodiment of the present invention. The image sensor includes a pixel array 1010, internal memory array 1020, array reset input 1030, and reset signal generator array. In the preferred embodiment, all of the above components are fabricated on a single chip.

Photosensor array 1010 is an array of photosensitive pixels capable of non-destructive readout, where each of the pixels is associated with a flag. Comparator 1020 compares the output of each pixel to a threshold. Flag setting unit 1030 sets the flag of each pixel for which the threshold has been crossed and which were reset in the preceding time interval. Array reset input 1040 serves for inputting an array reset signal. The image sensor may further include reset unit 1040, which resets those pixels whose flag is set. Thus a simultaneous reset of those pixels expected to saturate before the end of the full integration period is accomplished, while pixels not expected to saturate are not reset and continue with integration. In some embodiments, the comparison is repeated during the full integration time, preferably at a sequence of progressively shorter intervals.

It is expected that during the life of a patent maturing from this application many relevant photosensors, image sensors, imagers, pixels, memories, and readout modes will be developed and the scope of the term photosensor, image sensor, imager, pixel, memory, and readout mode is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which, for brevity, are described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate the invention in a non-limiting fashion.

Figure 11:
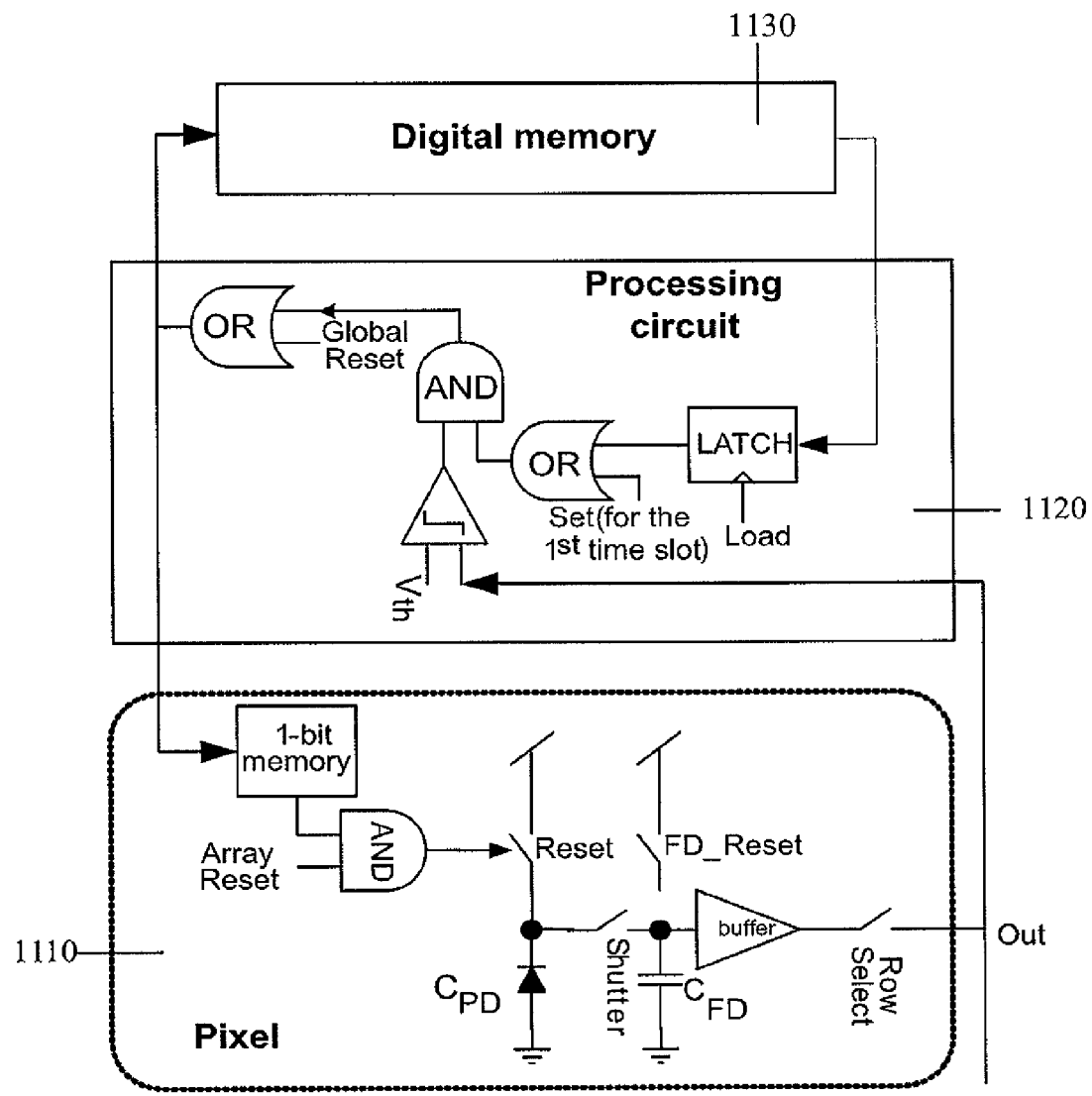
FIG. 11 is a simplified schematic diagram of an exemplary pixel with external processing circuitry and external digital memory.

Reference is now made to FIG. 11, which is a simplified schematic diagram of an exemplary single pixel 1110, its corresponding processing circuitry 1120 and external digital memory 1130. Note, that both processing circuit 1120 and pixel 1110 may be designed in different ways, while still implementing the described algorithm.

Pixel 1110 includes: (1) Photodiode, (2) Photodiode Reset switch, controlled by AND gate output, (3) Shutter switch, (4) 1-bit in-pixel digital memory for storing the flag (both static and dynamic memories may be implemented), (5) Analog buffer for analog signal readout, (6) Row Select switch, (7) AND gate to control locally reset operation of the pixel and (6) FD_Reset switch, used to reset the floating diffusion capacitance $C_{FD}$. Exemplary pixel configurations are presented in FIGS. 13a and 13b.

Processing circuitry 1120 includes an AND gate, two OR gates and a Latch logical element. In addition an analog comparator is employed to compare the pixel output to the threshold voltage ($V_{th\_snap}$).

The circuit of FIG. 11 operates as follows. At the beginning of the frame the photodiode capacitance $C_{PD}$ is reset by applying "Array Reset"='1'. Additionally a high digital value '1' is loaded into the in-pixel memory (i.e. the flag is set) by applying "Global Reset"='1'. The Shutter switch is "OFF" during the reset period.

The reset phase is stopped by applying "Array Reset"='0' and the photodiode capacitance $C_{PD}$ starts discharging, according to the energy of incident light. During the photodiode integration period the "Global Reset"='0'. Before reaching time $T_1$ when the first row pixels start comparison (i.e. $T_1 = T_{INT} - T_{INT}/X^1 - \Delta t_1$), the $C_{PD}$ capacitor is pre-charged to $V_{DD}$ voltage using the FD_Reset switch.

Figure 12:
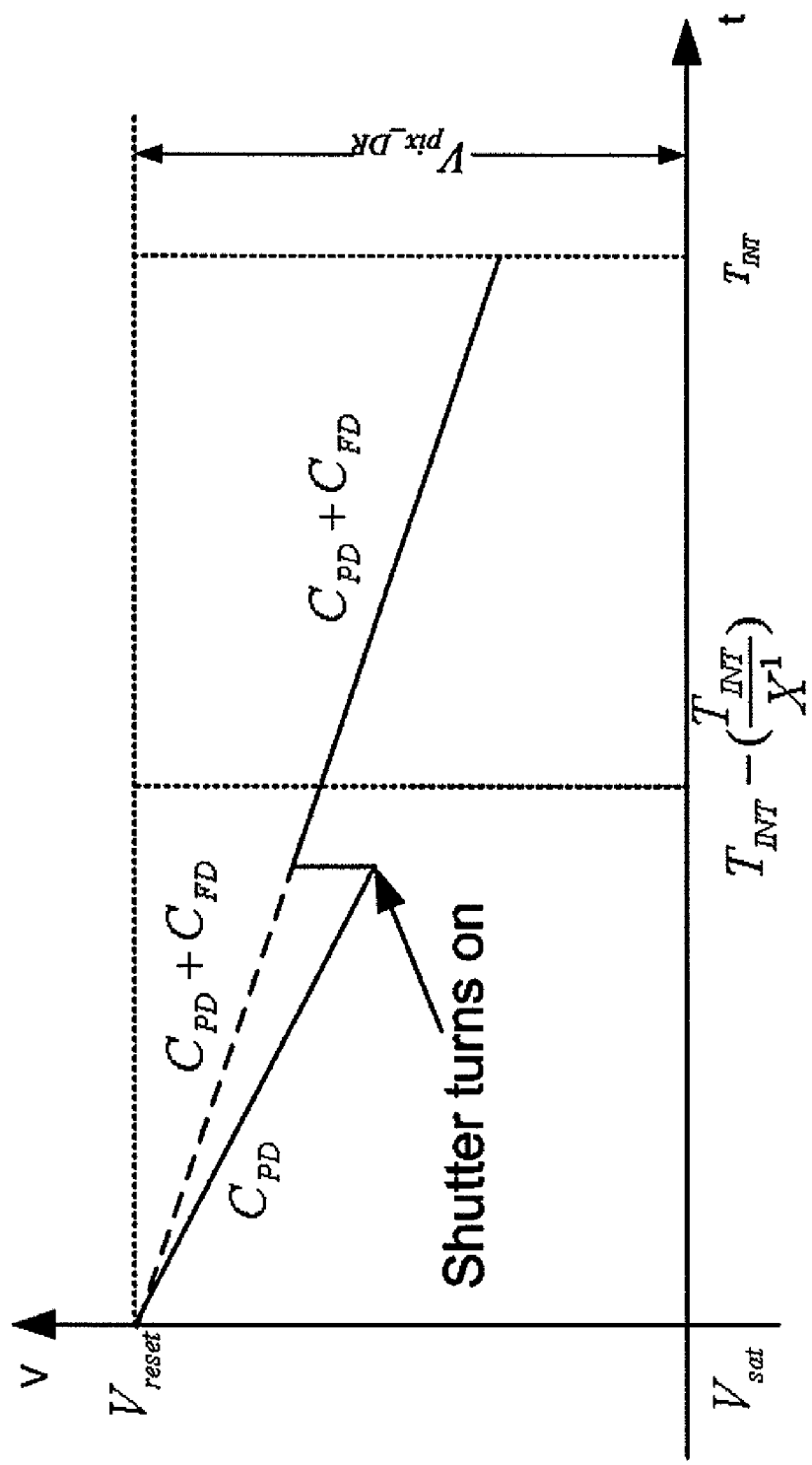
FIG. 12 is a simplified graph illustrating the voltage on the photodiode capacitor at the end of the charge transfer from $C_{PD}$ to $C_{FD}$.

Once the $C_{PD}$ precharged is completed, the Shutter switch is switched "ON", and allows charge transfer between the photodiode capacitance $C_{PD}$ and $C_{FD}$ floating diffusion capacitance. The voltage on the photodiode capacitor at the end of this charge transfer is similar to the voltage that could be achieved by discharging the photodiode $C_{PD}$ and $C_{FD}$ capacitances connected together from the beginning of the integration, as shown in FIG. 12. The Shutter switch remains switched "ON" till the end of the integration time $T_{INT}$.

For a pixel in row k, at the first time point $T_1 = T_{INT} - T_{INT}/X^1 - \Delta t_k$ (see Eqn. 2) the voltage on the photodiode capacitance $V_{PD}$ is read out using the analog buffer and is compared with an appropriate threshold $V_{th}$. The comparator result is transmitted directly to the in-pixel memory and to external digital memory 1130 (which stores the threshold event records), to input "First bit"='1' for the pixel. In cases where $V_{PD} < V_{th\_snap}$, meaning that the pixel will saturate at the end of the integration time, both the in-pixel and external memories are loaded with '1'. Otherwise, if $V_{PD} > V_{th\_snap}$ (meaning that the pixel will not saturate at the end of the integration time), '0' is loaded into both of the memories. The described process is then sequentially repeated for each row.

At the $(T_{INT} - T_{INT}/X^1)$ time point the "Array Reset" signal is activated, and the photodiodes in all pixels in the array are reset (or not), according to the data saved in the in-pixel memories. These simultaneous resets ensure the global shutter operation of the imager.

At the time point $(T_{INT} - T_{INT}/X^2 - \Delta t_k)$, the voltage on the photodiode $V_{PD}$ is read out and is compared again with an appropriate threshold $V_{th\_snap}$. The binary information concerning having the reset applied at $(T_{INT} - T_{INT}/X^1)$ time point, or not, is retrieved from the corresponding bit of digital memory 1130 and "AND"ed with the result of the photodiode voltage comparison with $V_{th}$ ("First bit"='0' is applied).

In the case where $V_{PD} < V_{th\_snap}$ ("Out"='1') and the retrieved digital data is '1' (meaning that pixel was reset at the preceding time point), both in-pixel and external memories are loaded with '1' and the pixel is reset again. In the case $V_{PD} < V_{th\_snap}$ ("Out"='1'), but the retrieved digital data is '0' (meaning that the pixel was not reset at the preceding time point), both in-pixel and external memories are loaded with '0' and the pixel will continue integration without reset. Finally, if $V_{PD} > V_{th\_snap}$ ("Out"='0'), independent of the retrieved data, both in-pixel and external memories are loaded with '0' and the pixel will continue integration without reset. At the $(T_{INT} - T_{INT}/X^2)$ time point, the "Array Reset" signal is activated again and the photodiodes in all pixels in the array are reset (or not), according to the data saved in the in-pixel memories.

The same process is performed for all pixels in the array for all remaining time points, $((T_{INT} - T_{INT}/X^3 - \Delta t_k) \ldots (T_{INT} - T_{INT}/X^W - \Delta t_k)$.

At the end of the full integration time $T_{INT}$, the capacitor $C_{FD}$ is disconnected from the photodiode by turning off the Shutter switch. Once this charge transfer has been completed, the photodiode is able to begin a new frame exposure, and the charge on $C_{FD}$ is held there until it is read out at its assigned time in a row-by-row readout sequence through the output chain. The value of the readout signal is associated with the analog value Man (see Eqn. 4).

Preferably, in order to improve the performance of the imager, $\Delta t_k$ is kept as small as possible and a reduction in $T_{decision}$ is desired. As previously mentioned, $T_{decision}$ is the time, required to decide whether each pixel in the specific row is going to be saturated at the next integration slot and than reset or no. The decision time $T_{decision}$ may be described as:

$$T_{decision} = T_{mem\_read} + T_{comp} + T_{mem\_write} \qquad (5)$$

where $T_{mem\_read}$ is the time required to retrieve the digital information from the memory during decision process (the algorithm relies on previous stored information), $T_{comp}$ is the time required to accomplish the digital processing and photodiode voltage comparison and $T_{mem\_write}$ is the time required to write the digital information to the memory.

Figure 13B:
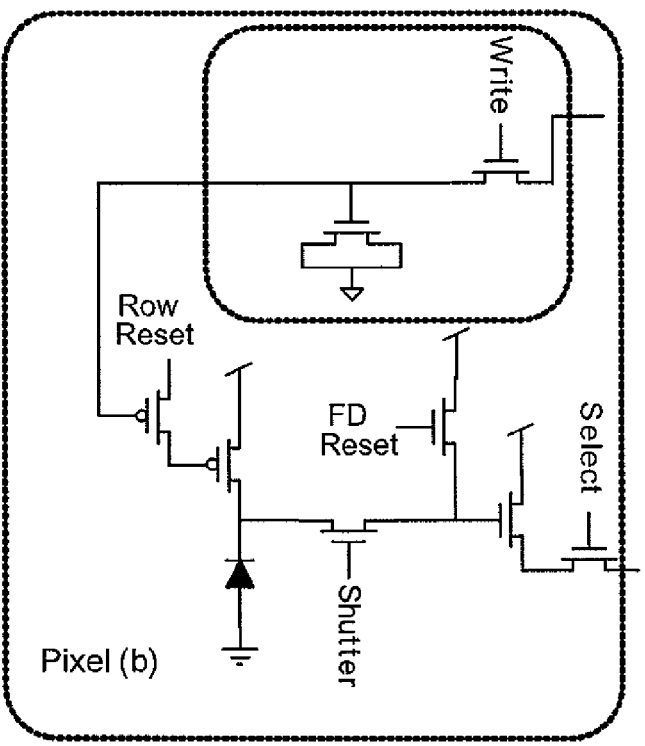

Reference is now made to FIGS. 13a and 13b, which show transistor implementations of a pixel with in-pixel memory for storing a flag indicative of the pixel reset state, according to a respective first and second preferred embodiment of the present invention. FIG. 13a shows a pixel with static in-pixel memory, whereas FIG. 13b shows a pixel with dynamic in-pixel memory.

Simulation Results

A test chip having two different 64*64 sensor arrays was implemented in a standard mixed-signal TSMC 0.18 µm CMOS technology available through MOSIS. An imager, including all proposed pixels was designed and simulated in a mixed-signal 0.18 µm CMOS technology. While operating at 1.8V voltage supply the proposed sensors achieve a dynamic range of up to 120 dB. The implemented arrays differ by their in-pixel 1-bit memory design. While the pixels in the first array employ in-pixel static memory, the pixels in the second array employ in-pixel dynamic memory.

Figure 14A:
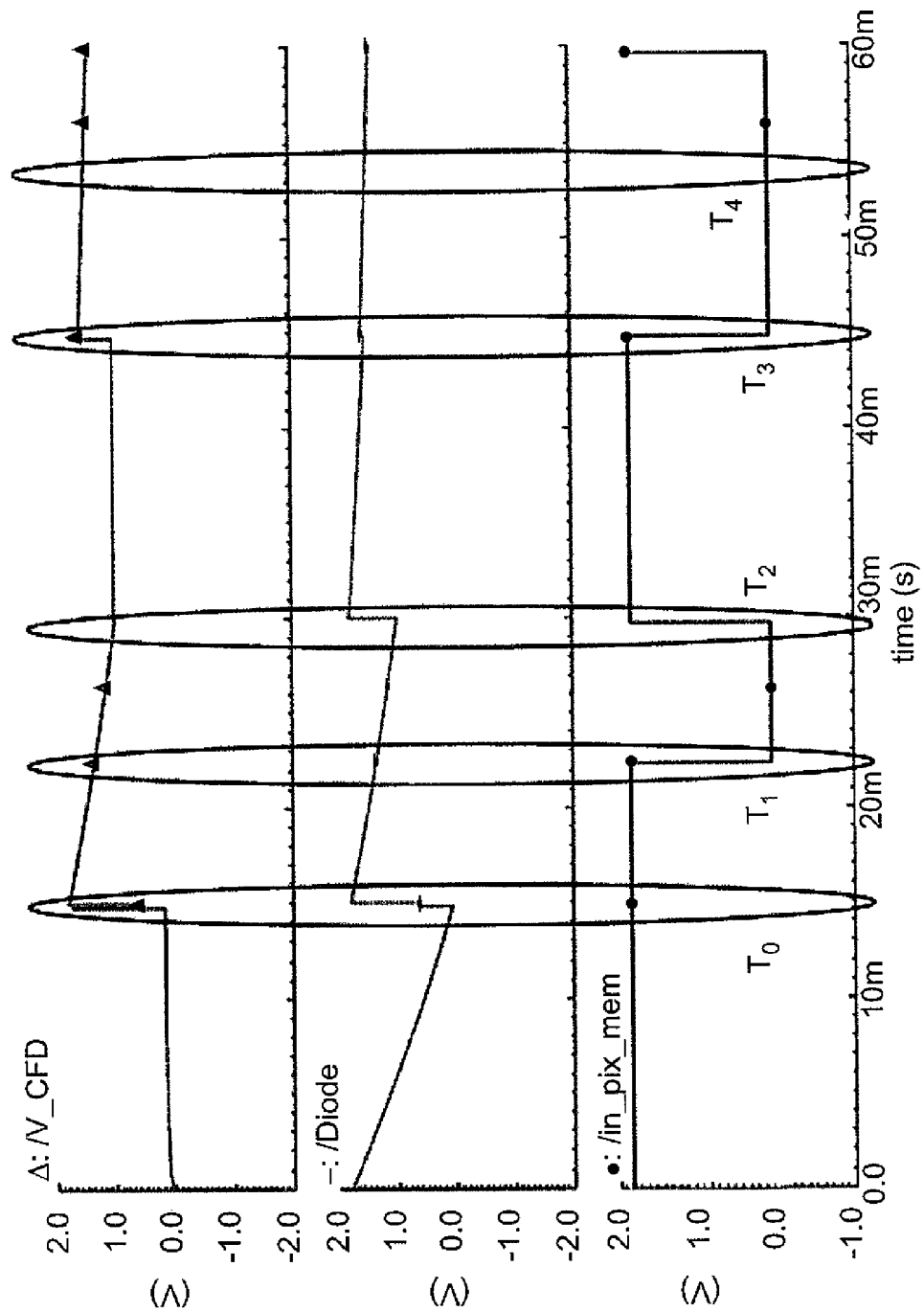
FIGS. 14a and 14b show simulation results for a single pixel.

FIG. 14a shows simulation results for two frames of $T_{INT}$=30 msec, for two different illumination levels.

In FIG. 14a shows the voltages on the photodiode ($V_{PD}$), on the $C_{FD}$ capacitance ($V_{CFD}$), and the value stored in the in-pixel 1-bit memory ("in_pixel_mem") for two sequential frames. Two bit dynamic range expansion was applied, i.e. comparisons were performed at $T_0 = T_{INT} - T_{INT}/X^1 - \Delta t_k$) and $T_1 = T_{INT} - T_{INT}/X^2 - \Delta t_k$ with X=2 during the first frame and at $T_3 = T_{INT} - T_{INT}/X^1 - \Delta t_k$ and $T_4 = T_{INT} - T_{INT}/X^2 - \Delta t_k$ during the second frame. $T_2$ indicates the end of the first frame and the start of the second frame.

In the presented simulation the illumination level was decreased for the second frame. It can be seen that for the first frame $V_{PD}$ passed the threshold $V_{th\_snap}$ at the first comparison ($T_0$ in FIG. 14a). This indicates that the pixel will saturate by the end of the integration time. Therefore the pixel was reset and '1' was written into the in-pixel digital memory. For other comparisons (at $T_1$, $T_3$ and $T_4$), $V_{PD}$ did not pass the threshold $V_{th}$, meaning that the pixel will not saturate by the end of the integration time. Therefore the pixel was not reset and '0' was written into the in-pixel digital memory.

Figure 14B:
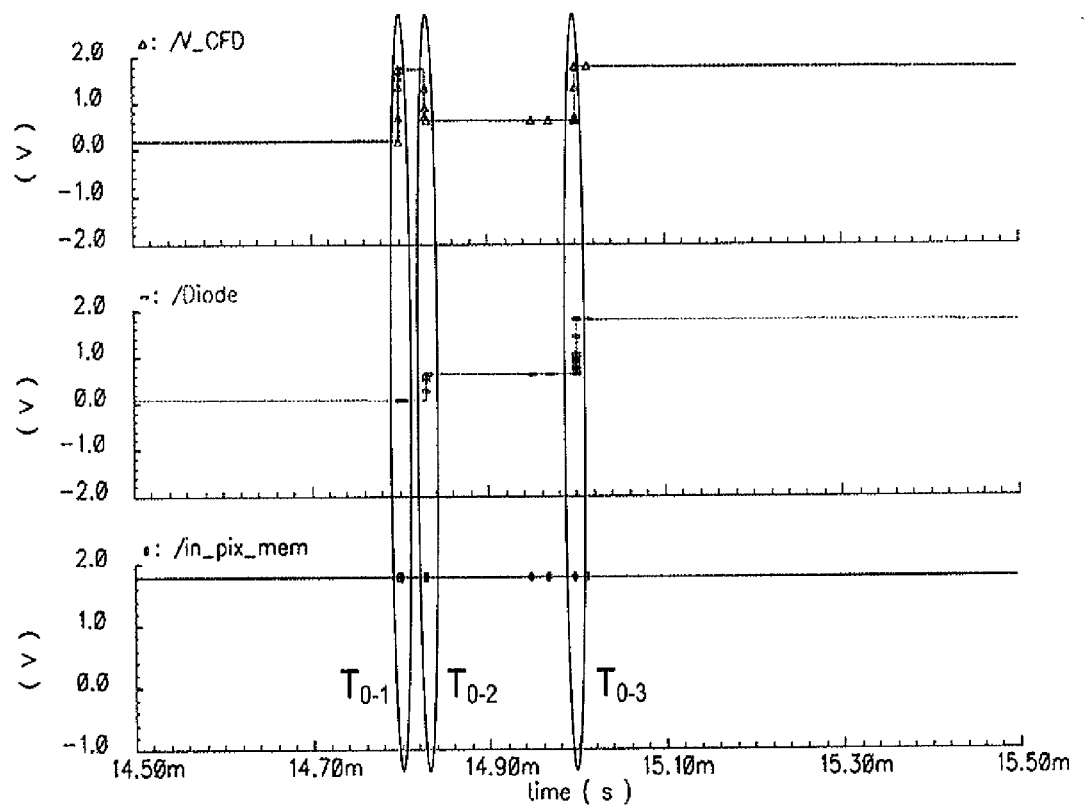

FIG. 14b zooms in to the first comparison shown in FIG. 14a, during the first frame ($T_0$ in FIG. 14a). The $T_{0-1}$ time point indicates the time when the $C_{FD}$ capacitor is reset using FD_Reset switch (see for example FIG. 13a). The $T_{0-2}$ time point indicates the time of operation of the Shutter switch, when the charge transfer between the photodiode $C_{pd}$ and $C_{FD}$ capacitances occurs. Finally, at $T_{0-3}$ both the photodiode and $C_{FD}$ capacitor are reset, according to the comparison result. A variety of additional simulations were carried out to ensure proper system operation.

The above presents embodiments for global shutter operation image sensors. The proposed image sensor expands the sensor dynamic range by applying adaptive exposure time to each pixel, according to the local illumination intensity level. Different pixel configurations were designed and simulated. A test chip, having two different 128*128 arrays was implemented in a standard TSMC 0.18 µm CMOS technology. While operating at 1.8V voltage supply the proposed sensors achieve the dynamic range up to 120 dB.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES CITED BY NUMERALS

1) E. Fossum, "CMOS image sensors: Electronic camera-on-a-chip", IEEE Trans. on Electron Devices, vol. 44, p. 1689, 1997.

2) H. S. Wong, "CMOS image sensors-recent advances and device scale considerations," in IEDM Tech. Dig., 1997, pp. 201-204.

3) K. Cho, A. I. Krymski, and E. R. Fossum, "A 1.5-V 550 µW 176x144 autonomous CMOS active pixel image sensor", IEEE Trans. on Electron Devices, Special Issue on Image Sensors, vol. 50, pp. 96-105, January, 2003.

4) O. Yadid-Pecht and R. Etienne-Cummings, "CMOS imagers: from phototransduction to image processing", Kluwer Academic Publishers.

5) E. Culurciello, R. Etienne-Cummings and K. Boahen, "Arbitrated address event representation digital image sensor", 2001 IEEE International Solid-State Circuits Conference, Digest of Technical Papers, ISSCC (Cat. No. 01CH37177), IEEE 2001, pp. 92-3, Piscataway, N.J.

6) L. G. McIlrath. "A Low-Power Low-Noise Ultrawide-Dynamic-Range CMOS Imager with Pixel-Parallel A/D Conversion", IEEE J. Solid State Circuits, Vol. 36, No. 5, pp 846-853, May 2001.

7) D. X. D. Yang, A. El Gamal, B. Fowler and H. Tian, "A 640x512 CMOS Image Sensor with Ultra Wide Dynamic Range Floating Point Pixel Level ADC", IEEE ISSCC, WA 17.5, 1999.

8) D. Stoppa, A. Simoni, L. Gonzo, M. Gottardi and G-F. Dalla Betta, "Novel CMOS image sensor with a 132-dB dynamic range", IEEE J. Solid State Circuits, Vol. 37, No. 12, December 2002.

9) T. Lule, M. Wagner, M. Verhoven, H. Keller and M. Bohm, "10000-pixel, 120 dB Imager in TFA Technology", IEEE J. Solid State Circuits, Vol. 35, No. 5, May 2000.

10) O. Yadid-Pecht, A. Belenky "In-Pixel Autoexposure CMOS APS." IEEE Journal of Solid-State Circuits, Vol. 38, No. 8, pp. 1425-1428, August 2003.

11) T. Hamamoto, K. Aizawa. "A computational image sensor with adaptive pixel based integration time", IEEE J. Solid State Circuits, Vol. 36, No. 4, pp 580-585, April 2001.

12) A. Fish, A. Belenky and O. Yadid-Pecht, "Wide Dynamic Range Snapshot APS for Ultra Low-Power Applications, *IEEE Transactions on Circuits and Systems II*, vol. 52, no. 11, pp. 729-733, November 2005.

13) O. Yadid-Pecht, "Wide dynamic range sensors", Optical Engineering, Vol. 38, No. 10, pp. 1650-1660, October 1999.

14) K. A. Boahen and A. G. Andreou, "A contrast sensitive retina with reciprocal synapses", Advances in Neural Information Processing, Vol. 4, pp. 762-772, 1992.

15) V. Ward, M. Syrzycki, G. Chapman, "CMOS photodetector with built in light adaptation mechanism", Microelectronics journal, Vol. 24, No. 5, pp. 547-553, August 1993.

16) W. Yang, "A wide-dynamic-range, low power photosensor array", IEEE ISSCC Vol. 37, 1994.

17) P. M. Acosta-Serafini, I. Masaki, C. G. Sodini, "A ⅓" VGA linear wide dynamic range CMOS image sensor implementing a predictive multiple sampling algorithm with overlapping integration intervals", IEEE Journal of Solid-State Circuits, Vol. 39, Issue: 9, Sep. 2004, Pages: 1487-1496

18) L. G. McIlrath, "A low-power low-noise ultrawide-dynamic-range CMOS imager with pixel-parallel A/D conversion", IEEE Journal of Solid-State Circuits, Vol. 36, Issue: 5, May 2001, Pages: 846-853

19) S. Kavusi and A. El Gamal, "Folded Multiple-Capture: An Architecture for High Dynamic Range Disturbance-Tolerant Focal Plane Array", in Proceedings of the SPIE Infrared Technology and Applications, Vol. 5406, Orlando, Fla., April 2004, pp. 351-360.

What is claimed is:

1. An image sensor comprising:
    an array comprising a plurality of photosensitive pixels, each of said pixels comprising a photosensor configured for outputting a signal indicative of an intensity of incident light, a single-bit in-pixel memory configured for storing a respective flag indicative of a pixel reset state, and a reset logic element configured for resetting said photosensor in accordance with a reset state stored in said in-pixel memory upon receipt of an array reset signal;
    an array reset input associated with said array, configured for inputting an array reset signal and for providing said array reset signal in parallel to each of said pixels in said array; and
    at least one comparator unit associated with said array, configured for comparing a photosensor readout signal to a threshold; and
    a logic unit associated with said comparator, said array reset input and said array, configured for setting each of said in-pixel memories to a respective reset state of said photosensor in accordance with a result of said comparison, conditional upon the reset of said pixel in the preceding time interval, and for loading said reset state into a flag of a respective pixel.

2. An image sensor according to claim 1, wherein said comparison is performed at a sequence of progressively shorter intervals.

3. An image sensor according to claim 1, further comprising an event recorder, configured for maintaining a respective record of threshold crossing events for each pixel of said array.

4. An image sensor according to claim 3, wherein said logic unit is configured to determine if said pixel was reset in the preceding time interval in accordance with said respective record of threshold crossing events.

5. An image sensor according to claim 1, further comprising a threshold generator configured for setting a respective threshold for each of said intervals to indicate pixels reaching a saturation level prior to a final readout time.

6. An image sensor according to claim 3, further comprising a processor configured for calculating an output illumination level associated with a given pixel in accordance with a respective record of threshold crossing events and a respective final pixel readout.

7. An image sensor according to claim 6, wherein said processor is configured to calculate said pixel illumination level as a product of said final pixel readout and a scaling factor derived from said respective record of threshold crossing events.

8. An image sensor according to claim 1, wherein said logic unit is further configured for providing said array reset signal to said array reset input after loading said respective reset states into all of said photosensitive pixels of said array.

9. An image sensor according to claim 1, wherein said logic unit is configured to set said flag only for pixels which were reset in the preceding time interval.

10. An image sensor according to claim 1, wherein said reset logic is configured to perform a logic operation on a state of said respective in-pixel memory and said reset signal, such that said respective photosensor is reset upon receipt of said reset signal only if said respective in-pixel memory is set to a reset state.

11. An image sensor according to claim 10, wherein said reset logic comprises an AND logic gate.

12. An image sensor comprising:
    an array of photosensitive pixels, each pixel comprising a photosensor and an in-pixel single-bit memory for storing a pixel flag;
    a comparator associated with said array, configured for comparing the output of each pixel to a threshold;
    a flag setting unit associated with said array and said comparator, configured for setting the flag of each pixel where the threshold is crossed; and
    a reset unit associated with said array, configured to reset any pixel whose flag is set, thereby to allow said pixel to continue light integration from a zero state.

13. The image sensor of claim 12, wherein said flag setting unit is configured to set said flag only for pixels which were reset in the preceding time interval.

14. The image sensor of claim 12, wherein said threshold is set to indicate pixels reaching a saturation level.

15. The image sensor of claim 12, wherein said comparator is configured to perform said comparison at a sequence of progressively shorter intervals.

16. A method for controlling pixel exposure time in an image sensor, comprising:
    exposing a pixel array to light for an integration time, wherein each pixel of said array comprises a photosensor and a single-bit in-pixel memory configured for storing a respective flag indicative of a pixel reset state;
    performing a non-destructive readout of said pixels at a sequence time intervals within said integration time;
    determining after each non-destructive readout, for each of said pixels, if said pixel is liable to saturate prior to a final readout;
    for each of said pixels, if a pixel is liable to saturate, setting said respective flag internally in said pixel and updating a respective record of threshold crossing events; and
    simultaneously resetting pixels whose flag is set to continue light integration from a zero state.

17. A method according to claim 16, wherein said intervals comprise a progressively decreasing sequence.

18. A method according to claim 16, wherein said performing a non-destructive readout comprises:
enabling rows of said array in turn; and
determining pixel output levels of each of said rows during enablement,
thereby to perform said readout on a row by row basis.

19. A method according to claim 16, further comprising:
performing a final readout of each of said pixels;
setting all of said flags to reset state; and
applying a reset signal in parallel to all of said pixels.

20. A method according to claim 16, further comprising calculating a respective pixel illumination level in accordance with a respective pixel reset count and a respective final pixel readout.

21. A method according to claim 20, wherein said calculating comprises multiplying said respective final pixel readout by a scaling factor derived from said respective pixel reset count.

22. A method according to claim 16, wherein said determining comprises comparing a readout level to a specified threshold.

23. A method according to claim 22, wherein said determining is conditional upon the reset of said pixel in the preceding time interval.

24. A method according to claim 22, further comprising selecting said specified threshold in accordance with a length of a current time interval.

25. A method according to claim 22, further comprising selecting said specified threshold in accordance with a readout time of said pixel relative to other pixels of said array.

26. A method according to claim 23, further comprising providing an array reset signal to said array reset input after loading said reset states into all of said pixels of said array.

27. A method according to claim 23, wherein a pixel is eligible for reset only if said pixel was reset in the preceding time interval.

* * * * *